(12) United States Patent
Fujimoto

(10) Patent No.: US 7,561,754 B2
(45) Date of Patent: Jul. 14, 2009

(54) IMAGE TRANSFORMATION APPARATUS FOR IMAGE TRANSFORMATION OF PROJECTED IMAGE BY PREVENTING DISTORTION

(75) Inventor: Takayuki Fujimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/122,286

(22) Filed: May 16, 2008

(65) Prior Publication Data

US 2008/0212896 A1 Sep. 4, 2008

Related U.S. Application Data

(60) Division of application No. 10/917,540, filed on Aug. 13, 2004, which is a continuation of application No. PCT/JP02/01314, filed on Feb. 15, 2002.

(51) Int. Cl.
- *G06K 9/36* (2006.01)
- *G06K 9/32* (2006.01)
- *G03B 21/14* (2006.01)
- *G06K 9/00* (2006.01)
- *H04N 5/64* (2006.01)
- *H04N 3/22* (2006.01)
- *H04N 3/26* (2006.01)

(52) U.S. Cl. .............. 382/277; 382/153; 382/276; 382/293; 382/295; 382/296; 353/69; 348/744; 348/745; 348/806

(58) Field of Classification Search ............ 382/153, 382/276, 277, 287, 289, 295, 296; 353/69; 345/647; 348/744–746, 806

See application file for complete search history.

(56) References Cited

U.S. PATENT DOCUMENTS

| | | | |
|---|---|---|---|
| 5,404,226 A * | 4/1995 | Kellner | 356/616 |
| 5,515,181 A | 5/1996 | Iyoda et al. | |
| 6,310,662 B1 * | 10/2001 | Sunakawa et al. | 348/747 |
| 6,367,933 B1 * | 4/2002 | Chen et al. | 353/69 |
| 6,381,375 B1 * | 4/2002 | Reyzin | 382/276 |
| 6,449,004 B1 | 9/2002 | Okisu et al. | |
| 6,450,647 B1 | 9/2002 | Takeuchi | |
| 6,652,104 B2 * | 11/2003 | Nishida et al. | 353/70 |
| 6,657,637 B1 * | 12/2003 | Inagaki et al. | 345/629 |

(Continued)

FOREIGN PATENT DOCUMENTS

EP 689353 A2 12/1995

(Continued)

OTHER PUBLICATIONS

U.S. Appl. No. 10/917,540, filed Aug. 13, 2004, Takayuki Fujimoto, Fujitsu Limited.

*Primary Examiner*—Samir A. Ahmed
*Assistant Examiner*—Gandhi Thirugnanam
(74) *Attorney, Agent, or Firm*—Fujitsu Patent Center

(57) ABSTRACT

An image transformation method to be implemented by a computer carries out an image transformation process, by transforming a picked up image that is picked up by a pickup unit having an optical axis tilted by an arbitrary angle with respect to a reference plane into an image substantially equivalent to a picked up image that is picked up by the pickup unit in a state where the optical axis of the pickup unit is perpendicular to the reference plane, and substituting luminance values of coordinates before the transformation as luminance values corresponding to coordinate values after the transformation.

3 Claims, 14 Drawing Sheets

U.S. PATENT DOCUMENTS

| | | | |
|---|---|---|---|
| 6,932,479 B2 * | 8/2005 | Kobayashi et al. | 353/69 |
| 7,252,386 B2 * | 8/2007 | Matsumoto | 353/69 |
| 7,347,564 B2 * | 3/2008 | Matsumoto et al. | 353/69 |
| 2001/0005204 A1 * | 6/2001 | Matsumoto et al. | 345/418 |
| 2001/0024231 A1 * | 9/2001 | Nakamura et al. | 348/58 |
| 2003/0048959 A1 * | 3/2003 | Peterson | 382/284 |
| 2004/0156558 A1 * | 8/2004 | Kim | 382/276 |
| 2004/0201825 A1 * | 10/2004 | Kobayashi et al. | 353/70 |
| 2008/0144973 A1 * | 6/2008 | Jin | 382/296 |

FOREIGN PATENT DOCUMENTS

| | | |
|---|---|---|
| EP | 1058452 A1 | 12/2000 |
| JP | 62-168287 | 7/1987 |
| JP | 2-131282 | 5/1990 |
| JP | 4-355740 | 12/1992 |
| JP | 5-252352 | 9/1993 |
| JP | 6-347233 | 12/1994 |
| JP | 8-9309 | 1/1996 |
| JP | 8-336092 | 12/1996 |
| JP | 9-138869 | 5/1997 |
| JP | 9-289610 | 11/1997 |
| JP | 10-49656 | 2/1998 |
| JP | 11-296152 | 10/1999 |
| JP | 11-305715 | 11/1999 |
| JP | 2001-134751 | 5/2001 |
| JP | 2001-177716 | 6/2001 |
| JP | 2002-007691 | 1/2002 |
| JP | 2002-007961 | 1/2002 |

* cited by examiner

FIG.15
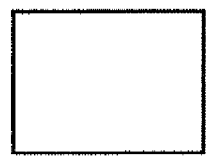
(a)
(b)
(c)
FIG.16
(a)
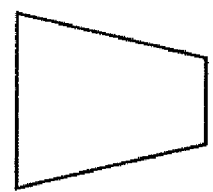
(b)
FIG.17
(a)
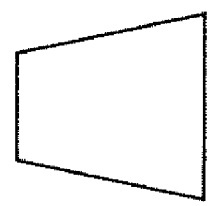
(b)
(c)

(b)    (a)

IMAGE TRANSFORMATION APPARATUS FOR IMAGE TRANSFORMATION OF PROJECTED IMAGE BY PREVENTING DISTORTION

CROSS-REFERENCE TO RELATED APPLICATIONS

This application is a Divisional application of application Ser. No. 10/917,540 filed Aug. 13, 2004, currently pending, which is a Continuation application filed under 35 U.S.C. 111(a) claiming the benefit under 35 U.S.C. 120 and 365(a) of a PCT International Application No. PCT/JP02/01314 filed Feb. 15, 2002, in the Japanese Patent Office.

BACKGROUND OF THE INVENTION

1. Field of the Invention

The present invention generally relates to image transformation methods and apparatuses, image recognition apparatuses, robot control apparatus and image projection apparatuses, and more particularly to image transformation method and apparatus for obtaining position coordinates by transforming image information picked up (or imaged) by an image pickup device (or imaging device), an image recognition apparatus for recognizing an image based on the position coordinates obtained by such an image transformation method, a robot control apparatus which uses such an image recognition apparatus, and an image projection apparatus which uses such an image transformation method.

2. Description of the Related Art

When assembling parts, devices and the like using a robot, it is necessary to accurately control movements of each part of an arm, a hand and the like of the robot. For example, when mounting a part on a substrate, the position of the robot hand with respect to the substrate can be detected based on an image which is picked up by a camera that is provided on the robot hand. However, as the movements of the robot hand become complex, the camera cannot always pickup the image in a direction perpendicular to the substrate surface. The robot hand may be moved to a position above the substrate surface from an outer side the substrate in a direction tilted with respect to the substrate surface, for example. In such a case, it is difficult to accurately detect various shapes within the image and the position of the robot hand above the substrate surface, based on the image which is picked up from the direction tilted with respect to the substrate surface. This is because an angle formed by an optical axis of the camera and the substrate surface is not always constant.

It is possible to provide marks on the substrate surface and use the marks as references within the picked up image, so as to improve to a certain extent the shape detection accuracy with which the various shapes within the image are detected and the position detection accuracy with which the position of the robot hand. However, in order to improve the shape detection accuracy with respect to the various shapes within the image and the position detection accuracy with respect to the robot hand, it is necessary to increase the number of marks. But depending on the number and size of the parts to be mounted on the substrate, there is a limit to the number of marks that may be provided on the substrate, and further, the marks may become hidden by the mounted parts.

If the shape detection accuracy with respect to the various shapes within the picked up image is poor, the image recognition accuracy using the picked up image deteriorates. In addition, when the shape detection accuracy with respect to the various shapes within the picked up image and the position detection accuracy with respect to the robot hand are poor, the mounting position accuracy of the parts mounted on the substrate deteriorates, and the robot hand may hit the substrate or the parts on the substrate when the robot hand is moved. For this reason, there are demands to improve the shape detection accuracy with respect to the various shapes within the picked up image and the position detection accuracy with respect to the robot hand, that is, to accurately detect the position coordinates within the picked up image.

On the other hand, in the image projection apparatuses such as a projector, an image is projected onto a screen or the like. But it is difficult to set up the image projection apparatus so that an optical axis of the image projection apparatus is perpendicular to the screen, and it may be impossible in some cases due to space restrictions. When the optical axis of the image projection apparatus is tilted with respect to the screen, the image projected onto the screen becomes distorted, and for example, an originally rectangular shape may be distorted and projected as a trapezoidal shape on the screen. The distortion of the image projected on the screen not only deteriorates the picture quality, but also makes the image awkward, unnatural and sometimes unpleasant to the viewer.

Conventionally, a system has been proposed to correct a vertical (up-and-down direction) distortion in the image projected on the screen by the so-called trapezoidal correction to correct the trapezoidal shape generated by the distortion into the rectangular shape. In addition, another system has been proposed to correct a horizontal (right-and-left direction) distortion in the image projected on the screen by the so-called trapezoidal correction to correct the trapezoidal shape generated by the distortion into the rectangular shape. The after system is employed in a side-shot projector, such as the projector VPL-HS1 (product name CINEZA) manufactured by SONY CORPORATION OF JAPAN, for example.

However, the conventional systems which use the trapezoidal correction cannot cope with a case where the optical axis of the image projection apparatus is tilted by an arbitrary angle in both the vertical direction and in the horizontal direction with respect to the screen. That is, the conventional system cannot cope with the case where the projection is at an arbitrary angle with respect to the screen. For this reason, there is a limit to improving the picture quality on the screen.

SUMMARY OF THE INVENTION

Accordingly, it is a general object of the present invention to provide a novel and useful image transformation method and apparatus, image recognition apparatus, robot control apparatus and image projection apparatus, in which the problems described above are eliminated.

A first specific object of the present invention is to provide image transformation method and apparatus which can transform a picked up image into an image from which position coordinates within the picked up image are accurately detectable regardless of the image pickup angle, and an image recognition apparatus for recognizing an image based on the position coordinates obtained by the image transformation method, and a robot control apparatus which uses such an image recognition apparatus.

A second specific object of the present invention is to provide an image projection apparatus which can prevent distortion from being generated within a projected image or a displayed image on a display, regardless of a projection angle or an angle of view.

Still another object of the present invention is to provide an image transformation method to be implemented by a computer to carry out an image transformation process, comprising a coordinate transformation step making a transformation to transform a picked up image that is picked up by a pickup unit having an optical axis tilted by an arbitrary angle with respect to a reference plane, into an image substantially equivalent to a picked up image that is picked up by the pickup unit in a state where the optical axis of the pickup unit is perpendicular to the reference plane; and a luminance value substituting step substituting luminance values of coordinates before the transformation as luminance values corresponding to coordinate values after the transformation. According to the image transformation method of the present invention, it is possible to realize the first object described above.

The coordinate transformation step may comprise:

carrying out a $-\beta$ rotation process to rotate coordinates (x, y) to coordinates (x', y') using a formula $$\begin{pmatrix} x' \\ y' \end{pmatrix} = \begin{pmatrix} \cos(-\beta) & -\sin(-\beta) \\ \sin(-\beta) & \cos(-\beta) \end{pmatrix} \begin{pmatrix} x \\ y \end{pmatrix};$$

carrying out a tilt transformation process to transform the coordinates (x', y') into coordinates (X', Y') using a formula $$\begin{pmatrix} X' \\ Y' \end{pmatrix} = \frac{1}{1 - x'\sin\alpha} \begin{pmatrix} x'\cos\alpha \\ y' \end{pmatrix}; \text{ and}$$

carrying out a $\gamma$ rotation process to rotate the coordinates (X', Y') to coordinates (X, Y) using a formula $$\begin{pmatrix} X \\ Y \end{pmatrix} = \begin{pmatrix} \cos\gamma & -\sin\gamma \\ \sin\gamma & \cos\gamma \end{pmatrix} \begin{pmatrix} X' \\ Y' \end{pmatrix},$$

where $\alpha$ denotes a tilt angle of the optical axis of the image pickup unit with respect to an axis perpendicular to the reference plane, $\beta$ denotes an angle formed by a straight line that is a projection of the optical axis on the reference plane and a reference axis (x-axis) of the reference plane, $\gamma$ denotes an angle formed by a tilt direction of the image pickup unit on the picked up image and a reference axis (X-axis) on the picked up image, (X, Y) denotes the coordinates on the picked up image, and (x, y) denotes the coordinates on the reference plane, wherein the formulas are successively calculated to obtain the coordinates (X, Y) before the transformation corresponding to the coordinates (x, y) of the picked up image after the transformation.

Further, the coordinate transformation step may comprise:

carrying out the $-\beta$ rotation process to rotate the coordinates (x, y) to the coordinates (x', y') using a formula $$\begin{pmatrix} x' \\ y' \end{pmatrix} = \begin{pmatrix} \cos(-\beta) & -\sin(-\beta) \\ \sin(-\beta) & \cos(-\beta) \end{pmatrix} \begin{pmatrix} i - i_0 \\ j_0 - j \end{pmatrix} dp;$$

carrying out the tilt transformation process to transform the coordinates (x', y') into the coordinates (X', Y') using a formula $$\begin{pmatrix} X' \\ Y' \end{pmatrix} = \frac{1}{1 - x'\sin\alpha} \begin{pmatrix} x'\cos\alpha \\ y' \end{pmatrix};$$

carrying out the $\gamma$ rotation process to rotate the coordinates (X', Y') to coordinates (X, Y) using a formula $$\begin{pmatrix} X \\ Y \end{pmatrix} = \begin{pmatrix} \cos\gamma & -\sin\gamma \\ \sin\gamma & \cos\gamma \end{pmatrix} \begin{pmatrix} X' \\ Y' \end{pmatrix}; \text{ and}$$

carrying out an inverse transformation process to inverse-transform the coordinates (X, Y) to coordinates (I', J') using a formula $$\begin{pmatrix} I' \\ J' \end{pmatrix} = \begin{pmatrix} I_0 + X/dp \\ J_0 - Y/dp \end{pmatrix},$$

where dp denotes a distance between two adjacent pixels on the reference plane, (I', J') denotes coordinates of pixels on the picked up image, (i, j) denotes coordinates of pixels of the picked up image after the transformation, and $(I_0, J_0)$ and $(i_0, j_0)$ denote centers of the respective picked up images before and after the transformation, wherein the formulas are successively calculated to obtain the coordinates (I', J') before the transformation corresponding to the coordinates (i, j) of the pixels of the picked up image after the transformation.

The luminance value substituting step may comprise:
obtaining I and J from a formula $$\begin{pmatrix} I \\ J \end{pmatrix} = \begin{pmatrix} [I'] \\ [J'] \end{pmatrix},$$

where 4 pixel coordinates actually existing in a neighborhood of the coordinates (I', J') are (I, J), (I+1, J), (I, J+1) and (I+1, J+1), and [ ] denotes a Gauss symbol; and obtaining a weighted average of pixel values of the neighboring 4 pixels using a formula p(i, j)=(I+J−J'){(I+I−I')P(I, J)+(I'−I)P(I+1, J)}+(J'−J){(I+I−I')P(I, J+1)+(I'−I)P(I+1, J+1)}, where P(I, J) denotes the luminance value of the original image, and p(i, j) denotes the luminance value after the transformation.

A further object of the present invention is to provide an image transformation apparatus comprising a coordinate transformation unit configured to make a transformation to transform a picked up image that is picked up by a pickup unit having an optical axis tilted by an arbitrary angle with respect to a reference plane, into an image substantially equivalent to a picked up image that is picked up by the pickup unit in a state where the optical axis of the pickup unit is perpendicular to the reference plane; and a luminance value substituting unit configured to substitute luminance values of coordinates before the transformation as luminance values corresponding to coordinate values after the transformation. According to the image transformation apparatus of the present invention, it is possible to realize the first object described above.

The coordinate transformation unit may comprise:
a part configured to carry out a $-\beta$ rotation process to rotate coordinates (x, y) to coordinates (x', y') using a formula $$\begin{pmatrix} x' \\ y' \end{pmatrix} = \begin{pmatrix} \cos(-\beta) & -\sin(-\beta) \\ \sin(-\beta) & \cos(-\beta) \end{pmatrix} \begin{pmatrix} x \\ y \end{pmatrix};$$

a part configured to carry out a tilt transformation process to transform the coordinates (x', y') into coordinates (X', Y') using a formula $$\begin{pmatrix} X' \\ Y' \end{pmatrix} = \frac{1}{1 - x' \sin\alpha} \begin{pmatrix} x' \cos\alpha \\ y' \end{pmatrix}; \text{ and}$$

a part configured to carry out a γ rotation process to rotate the coordinates (X', Y') to coordinates (X, Y) using a formula $$\begin{pmatrix} X \\ Y \end{pmatrix} = \begin{pmatrix} \cos\gamma & -\sin\gamma \\ \sin\gamma & \cos\gamma \end{pmatrix} \begin{pmatrix} X' \\ Y' \end{pmatrix},$$

where α denotes a tilt angle of the optical axis of the image pickup unit with respect to an axis perpendicular to the reference plane, β denotes an angle formed by a straight line that is a projection of the optical axis on the reference plane and a reference axis (x-axis) of the reference plane, γ denotes an angle formed by a tilt direction of the image pickup unit on the picked up image and a reference axis (X-axis) on the picked up image, (X, Y) denotes the coordinates on the picked up image, and (x, y) denotes the coordinates on the reference plane, wherein the formulas are successively calculated to obtain the coordinates (X, Y) before the transformation corresponding to the coordinates (x, y) of the picked up image after the transformation.

Further, the coordinate transformation unit may comprise:

a part configured to carry out the −β rotation process to rotate the coordinates (x, y) to the coordinates (x', y') using a formula $$\begin{pmatrix} x' \\ y' \end{pmatrix} = \begin{pmatrix} \cos(-\beta) & -\sin(-\beta) \\ \sin(-\beta) & \cos(-\beta) \end{pmatrix} \begin{pmatrix} i - i_0 \\ j_0 - j \end{pmatrix} dp;$$

a part configured to carry out the tilt transformation process to transform the coordinates (x', y') to the coordinates (X', Y') using a formula $$\begin{pmatrix} X' \\ Y' \end{pmatrix} = \frac{1}{1 - x' \sin\alpha} \begin{pmatrix} x' \cos\alpha \\ y' \end{pmatrix};$$

a part configured to carry out the γ rotation process to rotate the coordinates (X', Y') to coordinates (X, Y) using a formula $$\begin{pmatrix} X \\ Y \end{pmatrix} = \begin{pmatrix} \cos\gamma & -\sin\gamma \\ \sin\gamma & \cos\gamma \end{pmatrix} \begin{pmatrix} X' \\ Y' \end{pmatrix}; \text{ and}$$

a part configured to carry out an inverse transformation process to inverse-transform the coordinates (X, Y) to coordinates (I', J') using a formula $$\begin{pmatrix} I' \\ J' \end{pmatrix} = \begin{pmatrix} I_0 + X/dp \\ J_0 - Y/dp \end{pmatrix},$$

where dp denotes a distance between two adjacent pixels on the reference plane, (I', J') denotes coordinates of pixels on the picked up image, (i, j) denotes coordinates of pixels of the picked up image after the transformation, and $(I_0, J_0)$ and $(i_0, j_0)$ denote centers of the respective picked up images before and after the transformation, wherein the formulas are successively calculated to obtain the coordinates (I', J') before the transformation corresponding to the coordinates (i, j) of the pixels of the picked up image after the transformation.

The luminance value substituting unit may comprise:
a part configured to obtain I and J from a formula $$\begin{pmatrix} I \\ J \end{pmatrix} = \begin{pmatrix} [I'] \\ [J'] \end{pmatrix}$$

where 4 pixel coordinates actually existing in a neighborhood of the coordinates (I', J') are (I, J), (I+1, J), (I, J+1) and (I+1, J+1), and [ ] denotes a Gauss symbol; and a part configured to obtain a weighted average of pixel values of the neighboring 4 pixels using a formula p(i, j)=(I+J−J'){(I+I−I')P(I, J)+(I'−I)P(I+1, J)}+(J'−J){(I+I−I')P(I, J+1)+(I'−I)P(I+1, J+1)}, where P(I, J) denotes the luminance value of the original image, and p(i, j) denotes the luminance value after the transformation.

Another object of the present invention is to provide an image recognition apparatus comprising an image recognition unit configured to carry out an image recognition process based on an image after the transformation output from the image transformation apparatus described above. According to the image recognition apparatus of the present invention, it is possible to realize the first object described above.

Still another object of the present invention is to provide a robot control apparatus comprising a control unit configured to control operations of a robot based on an image recognition result output from the image recognition apparatus described above. According to the robot control apparatus of the present invention, it is possible to realize the first object described above.

A further object of the present invention is to provide an image transformation apparatus comprising a coordinate transformation unit configured to make a transformation to transform a projected image that is projected on a screen by an image projection apparatus having an optical axis tilted by an arbitrary angle with respect to the screen, into an image substantially equivalent to an image that is projected on the screen in a state where the optical axis of the image projection apparatus is perpendicular to the screen; and a luminance value substituting unit configured to substitute luminance values of coordinates before the transformation as luminance values corresponding to coordinate values after the transformation. According to the image transformation apparatus of the present invention, it is possible to realize the second object described above.

The coordinate transformation unit may comprise:
a part configured to carry out a −γ rotation process to rotate coordinates (X, Y) to coordinates (X', Y') using a formula $$\begin{pmatrix} X' \\ Y' \end{pmatrix} = \begin{pmatrix} \cos(-\gamma) & -\sin(-\gamma) \\ \sin(-\gamma) & \cos(-\gamma) \end{pmatrix} \begin{pmatrix} I - I_0 \\ J_0 - J \end{pmatrix} dp;$$

a part configured to carry out a tilt transformation process to transform the coordinates (X', Y') into coordinates (x', y') using a formula $$\begin{pmatrix} x' \\ y' \end{pmatrix} = \frac{1}{1\cos\alpha + X'\sin\alpha} \begin{pmatrix} X' \\ Y'\cos\alpha \end{pmatrix}; \text{ and}$$

a part configured to carry out a β rotation process to rotate the coordinates (x', y') to coordinates (x, y) using a formula $$\begin{pmatrix} x \\ y \end{pmatrix} = \begin{pmatrix} \cos\beta & -\sin\beta \\ \sin\beta & \cos\beta \end{pmatrix} \begin{pmatrix} x' \\ y' \end{pmatrix},$$

where α denotes a tilt angle of the optical axis of the image projection apparatus with respect to an axis perpendicular to the screen, β denotes an angle formed by a straight line that is a projection of the optical axis on the screen and a reference axis (x-axis) of the screen, γ denotes an angle formed by a tilt direction of the image projection apparatus on the projected image and a reference axis (X-axis) on the projected image, (X, Y) denotes the coordinates on the projected image, and (x, y) denotes the coordinates on the screen, wherein the formulas are successively calculated to obtain the coordinates (x, y) before the transformation corresponding to the coordinates (X, Y) of the projected image after the transformation.

The coordinate transformation unit may comprise:

a part configured to carry out the −γ rotation process to rotate the coordinates (X, Y) to the coordinates (X', Y') using a formula $$\begin{pmatrix} X' \\ Y' \end{pmatrix} = \begin{pmatrix} \cos(-\gamma) & -\sin(-\gamma) \\ \sin(-\gamma) & \cos(-\gamma) \end{pmatrix} \begin{pmatrix} I - I_0 \\ J_0 - J \end{pmatrix} dp;$$

a part configured to carry out the tilt transformation process to transform the coordinates (X', Y') to the coordinates (x', y') using a formula $$\begin{pmatrix} x' \\ y' \end{pmatrix} = \frac{1}{1\cos\alpha + X'\sin\alpha} \begin{pmatrix} X' \\ Y'\cos\alpha \end{pmatrix};$$

a part configured to carry out the β rotation process to rotate the coordinates (x', y') to coordinates (x, y) using a formula $$\begin{pmatrix} x \\ y \end{pmatrix} = \begin{pmatrix} \cos\beta & -\sin\beta \\ \sin\beta & \cos\beta \end{pmatrix} \begin{pmatrix} x' \\ y' \end{pmatrix}; \text{ and}$$

a part configured to carry out an inverse transformation process to inverse-transform the coordinates (x, y) to coordinates (i', j') using a formula $$\begin{pmatrix} i' \\ j' \end{pmatrix} = \begin{pmatrix} i_0 + x/dp \\ j_0 - y/dp \end{pmatrix},$$

where dp denotes a distance between two adjacent pixels on the screen, (I', J') denotes coordinates of pixels on the projected image, (i, j) denotes coordinates of pixels of the projected image after the transformation, and ($I_0$, $J_0$) and ($i_0$, $j_0$) denote centers of the respective projected images before and after the transformation, wherein the formulas are successively calculated to obtain the coordinates (I', J') before the transformation corresponding to the coordinates (i, j) of the pixels of the projected image after the transformation.

The luminance value substituting unit may comprise:

a part configured to obtain i and j from a formula $$\begin{pmatrix} i \\ j \end{pmatrix} = \begin{pmatrix} [i'] \\ [j'] \end{pmatrix},$$

where 4 pixel coordinates actually existing in a neighborhood of the coordinates (i', j') are (i, j), (i+1, j), (i, j+1) and (i+1, j+1), and [ ] denotes a Gauss symbol; and a part configured to obtain a weighted average of pixel values of the neighboring 4 pixels using a formula p(I, J)=(I+j−j'){(I+i−i')P(i, j)+(i'−i)P(i+1, j)}+(j'−j){(I+i−i')P(i, j+1)+(i'−i)P(i+1, j+1)}, where P(i, j) denotes the luminance value of the original image, and p(I, J) denotes the luminance value after the transformation.

Another object of the present invention is to provide an image transformation method to be implemented by a computer to carry out an image transformation process, comprising, when viewing an image displayed on a display from a viewing position that is oblique to a position perpendicular to the display, carrying out an image transformation process with respect to the image to be displayed on the display depending on an angle of the viewing position with respect to the display. According to the image transformation method of the present invention, it is possible to achieve the second object described above.

Still another object of the present invention is to provide an image transformation method to be implemented by a computer to carry out an image transformation process, comprising, when viewing an image that is projected on a screen by an image projection apparatus located at a projecting position that is oblique to a position perpendicular to the screen, from a viewing position that is oblique to the position perpendicular to the screen, carrying out an image transformation process with respect to the image to be projected on the screen depending on an angle of the projecting position with respect to the screen and an angle of the viewing position with respect to the screen. According to the image transformation method of the present invention, it is possible to achieve the second object described above.

Other objects and further features of the present invention will be apparent from the following detailed description when read in conjunction with the accompanying drawings.

BRIEF DESCRIPTION OF THE DRAWINGS

FIG. 15 is a diagram for explaining an image transformation process;

FIG. 16 is a diagram for explaining a distortion of an image projected on a screen by an image projection apparatus;

FIG. 17 is a diagram for explaining a reverse image transformation process applicable to the image projection apparatus;

DETAILED DESCRIPTION OF THE PREFERRED EMBODIMENTS

Figure 1:
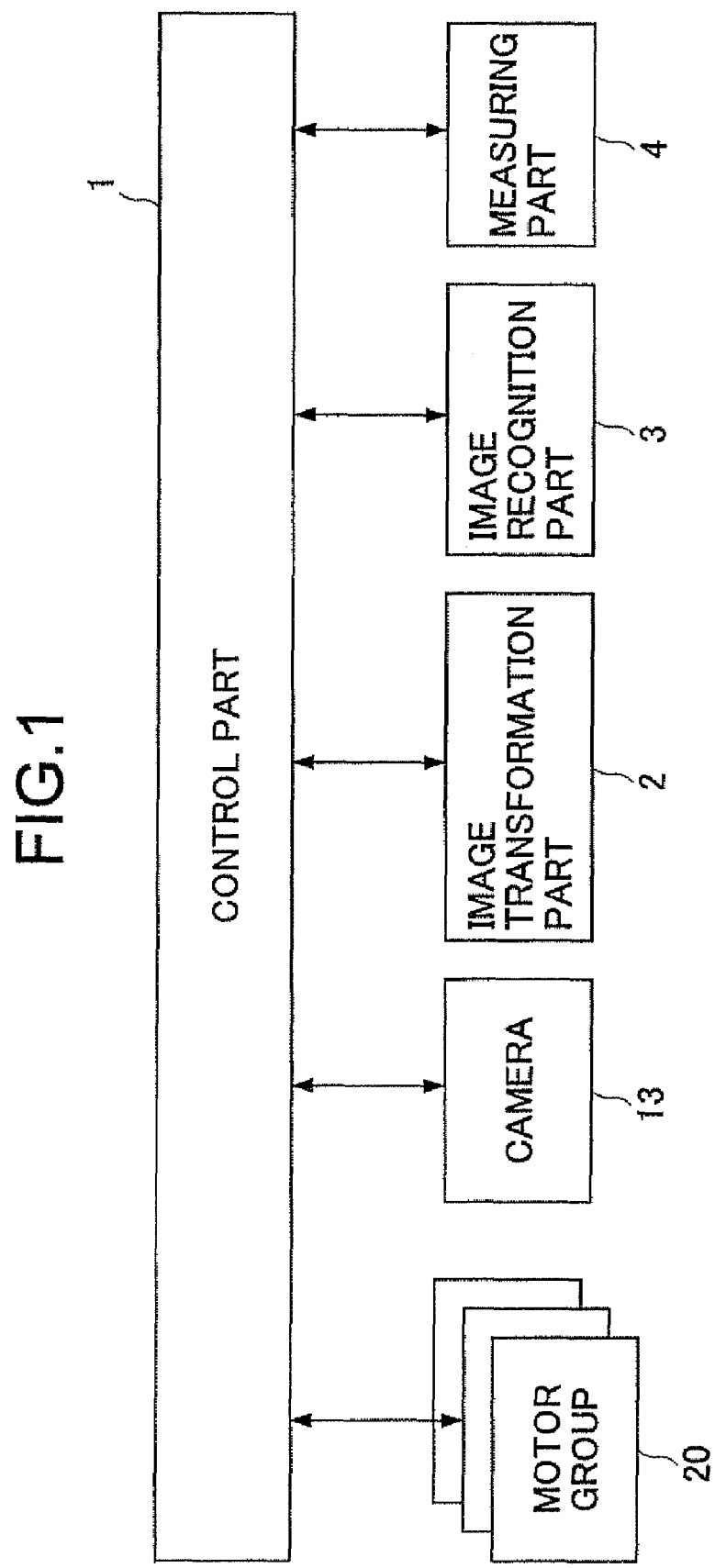
FIG. 1 is a system block diagram showing an embodiment of a robot control apparatus according to the present invention.

A description will be given of embodiments of the image transformation method and apparatus, the image recognition apparatus, the robot control apparatus and the image projection apparatus according to the present invention, by referring to the drawings.

FIG. 1 is a system block diagram showing an embodiment of the robot control apparatus according to the present invention. This embodiment of the robot control apparatus employs an embodiment of the image transformation method according to the present invention, an embodiment of the image transformation apparatus according to the present invention, and an embodiment of the image recognition apparatus according to the present invention.

The robot control apparatus shown in FIG. 1 includes a control part 1, an image transformation part 2, an image recognition part 3 and a measuring part 4. A camera 13 and a motor group 20 are provided in a robot which will be described later in conjunction with FIG. 2. The control part 1 has a known hardware structure made up of a processor such as a CPU, and a memory for storing computer programs to be executed by the processor and various kinds of data including intermediate results of operations carried out by the processor. The memory may be coupled externally to the control part 1, and may be formed by a storage unit such as a disk drive, a semiconductor memory device such as a RAM, and the like. The control part 1 controls the entire operation of the robot control apparatus. As will be described later, the image transformation part 2 transforms an image picked up by the camera 13 into an image from which the position coordinates within the picked up image are accurately detectable. The image recognition part 3 recognizes the picked up image, based on the transformed image obtained by the image transformation part 2. The image recognition part 3 itself may employ known structure and algorithm, but is characterized in that the image recognition is carried out based on the transformed image obtained by the image transformation part 2. The measuring part 4 measures currents, voltages and the like that are detected by the robot. The control part 1 carries out various kinds of tests with respect to an object 32 shown in FIG. 2, based on the currents, voltages and the like that are measured by the measuring part 4. The control part 1 controls each of the motors forming the motor group 20, based on outputs of the image transformation part 2 and the image recognition part 3 with respect to the input from the camera 13, and controls movements of each part of the robot with respect to the object 32 that is placed on a stage 31 shown in FIG. 2.

The image transformation part 2 employs this embodiment of the image transformation method, and forms this embodiment of the image transformation apparatus. In addition, the image recognition part 3, together with the image transformation part 2, forms this embodiment of the image recognition apparatus.

Figure 2:
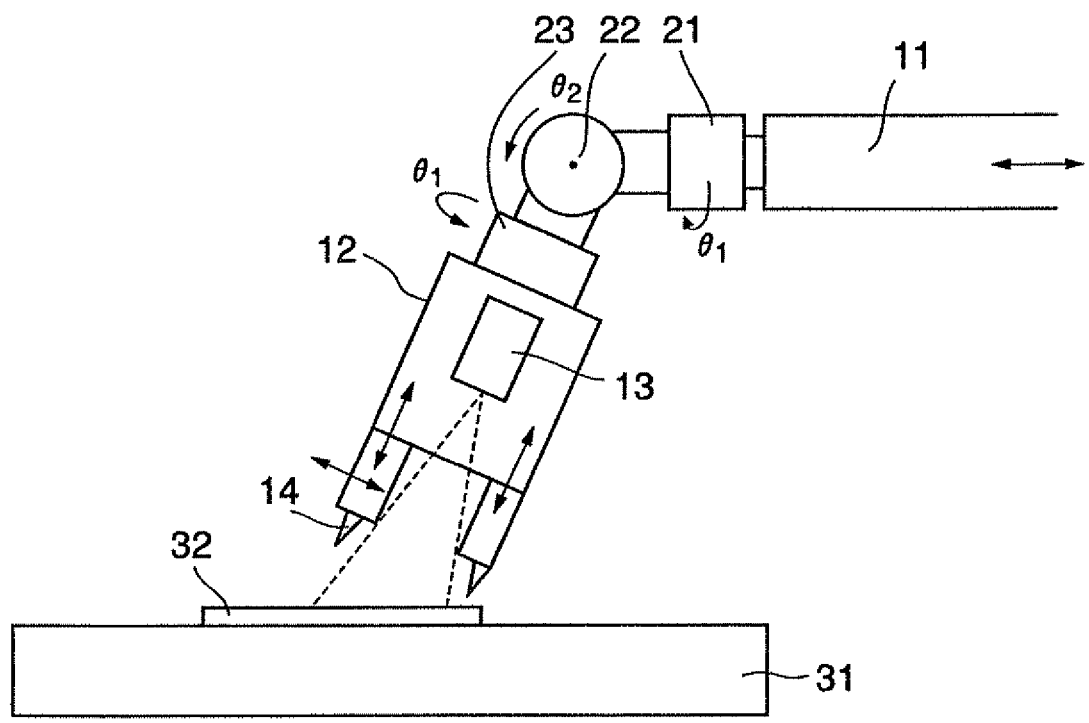
FIG. 2 is a diagram showing an important part of a robot.

FIG. 2 is a diagram showing an important part of the robot. The robot includes an arm 11, a hand 12, the camera 13, pins 14, and motors 21, 22 and 23. The arm 11 has a known structure and is movable in an arbitrary direction. The motors 21, 22 and 23 form the motor group 20, and move the hand 12 in an arbitrary direction with respect to the arm 11. The motor 21 drives the hand 12 within an angular range θ1, the motor 22 drives the hand 12 within an angular range θ2, and the motor 23 drives the hand 12 within an angular range θ3. The camera 13 picks up an image viewed from the hand 12 and sends the picked up image to the control part 1, so as to enable the position of the hand 12 to be detected. The camera 13 is not limited to a specific type, and may be formed by a CCD camera or the like. The pins 14 contact electrodes of the object 32 which is placed on the stage 31, and is used to apply currents or voltages to the object 32 and to detect currents and voltages generated in response to the applied currents or voltages. For example, the object 32 is a circuit board.

In this embodiment, it is assumed for the sake of convenience that the robot tests the object 32, but the usage of the robot is not limited to such. For example, clamps or the like may be provided on the hand 12 in place of the pins 14, so that the clamps may mount parts on the object 32. In other words, the robot simply needs to have a structure including an image pickup means (or imaging means) such as the camera 13, and controlled based on an image picked up by the image pickup means.

Next, a description will be given of an image transformation process of the image transformation part 2.

Figure 3:
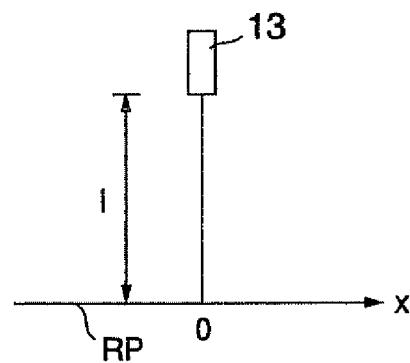
FIG. 3 is a diagram showing a relationship of a camera and a reference plane in an initial state.

First, a state is considered where the camera 13 is located at a position separated by a distance I from an origin on a target plane (hereinafter referred to as a reference plane RP), such as a top surface of the stage 31, in a direction perpendicular to the reference plane RP, and parallel to a normal to the reference plane RP. In addition, the position of the camera 13 is adjusted by rotating the camera 13 parallel to the reference plane RP before fixing the position, so that an x-axis on an image picked up by the camera 13 matches an x-axis on the reference plane RP. FIG. 3 is a diagram showing a relationship of the camera 13 and the reference plane RP in this initial state.

Figure 4:
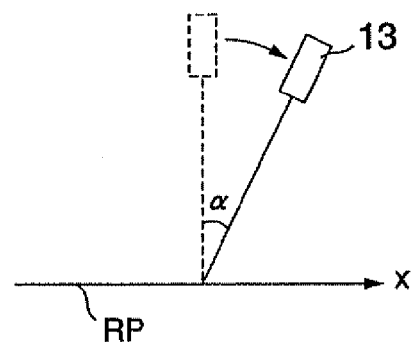
FIG. 4 is a diagram showing a state where the camera is tilted in a positive direction of an x-axis of the reference plane.

FIG. 4 is a diagram showing a state where the camera 13 is tilted by an angle (tilt angle) α in a positive direction of the x-axis of the reference plane RP, from the initial state shown in FIG. 3. In this case, consideration will be given of how an arbitrary point (x, y) on the reference plane RP moves on the picked up image. Since tilting the camera 13 with respect to the reference plane RP is equivalent to tilting the reference plane RP with respect to the camera 13 in an opposite direction, a description will be given of a case where the reference plane RP is tilted with respect to the camera 13, for the sake of convenience.

Figure 5:
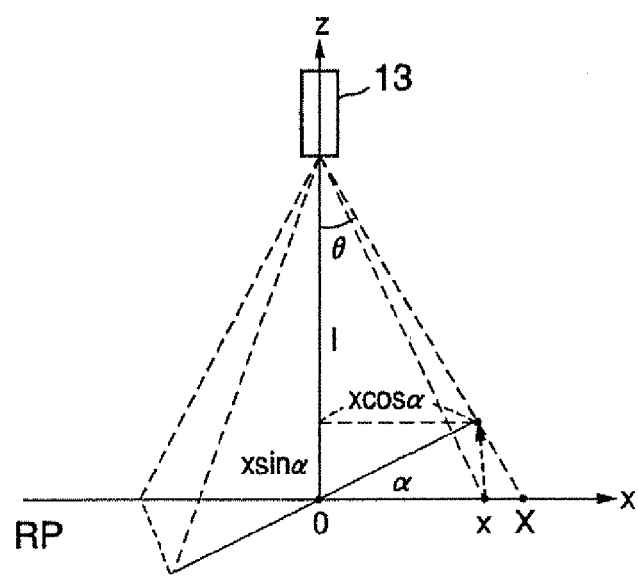
FIG. 5 is a diagram for explaining a movement of a point on the reference plane in an x-direction.

FIG. 5 is a diagram for explaining a movement of a point on the reference plane RP in an x-direction. When the reference plane RP is tilted by the angle α, a point x on the reference plane RP appears, on the picked up image, as if the point x moved to an original point X on the reference plane RP before the reference plane RP was tilted by the angle α. Accordingly, an angle θ formed by an imaginary line connecting the camera 13 and the point X, and a z-axis in FIG. 5, satisfies the following two formulas.

tan θ=X/I tan θ=x cos α/(I−x sin α)

The following formula (1) can be obtained when the relationship of X and x is obtained from these two formulas.

X=(Ix cos α)/(I−x sin α)　　(1)

The following inverse transformation formula (2) can be obtained by carrying out the following transformation with respect to the formula (1).

X(I−x sin α)=Ix cos α x(I cos α+X sin α)=XI x=XI/(I cos α+X sin α)　　(2)

Figure 6:
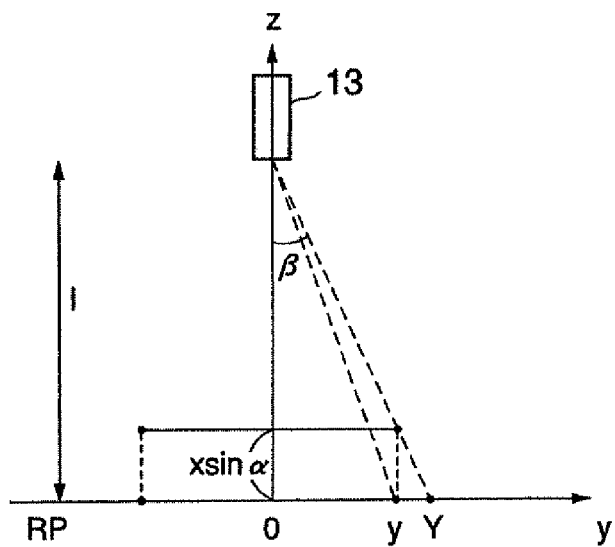
FIG. 6 is a diagram for explaining a movement of a point on the reference plane in a y-direction.

FIG. 6 is a diagram for explaining a movement of a point on the reference plane RP in the y-direction. When the reference plane RP is tilted by the angle α, a point y on the reference plane RP appears, on the picked up image, as if the point y moved to an original point Y on the reference plane RP before the reference plane RP was tilted by the angle α. Accordingly, an angle β formed by an imaginary line connecting the camera 13 and the point Y, and the z-axis in FIG. 6, satisfies the following two formulas.

tan β=Y/I tan β=y/(I−x sin α)

The following formula (3) can be obtained when the relationship of Y and y is obtained from these two formulas.

Y=Iy/(I−x sin α)　　(3)

The following inverse transformation formula (4) can be obtained by carrying out the following transformation with respect to the formula (3) and substituting the inverse transformation formula (2).

Iy=Y(I−x sin α)

Iy=Y{I−(XI sin α)/(I cos α+X sin α)} y=Y{I cos α/(I cos α+X sin α)}　　(4)

The formulas (1) and (2) can be described by the following formula (5), and the formulas (3) and (4) can be described by the following formula (6).

$$\begin{pmatrix} X \\ Y \end{pmatrix} = \frac{1}{1 - x\sin\alpha} \begin{pmatrix} x\cos\alpha \\ y \end{pmatrix} \quad (5)$$

$$\begin{pmatrix} x \\ y \end{pmatrix} = \frac{1}{1\cos\alpha + X\sin\alpha} \begin{pmatrix} X \\ Y\cos\alpha \end{pmatrix} \quad (6)$$

Figure 7:
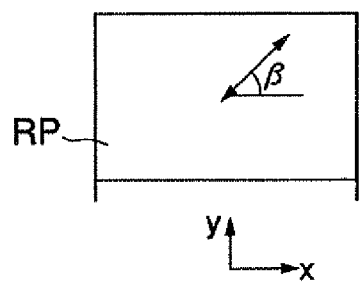
FIG. 7 is a diagram for explaining a tilt direction of the camera with respect to the reference plane.
Figure 8:
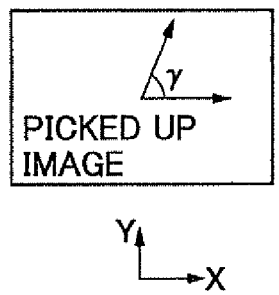
FIG. 8 is a diagram for explaining a tilt direction of the camera on a picked up image.

The transformation formulas (5) and (6) stand on the assumption that the tilt direction of the camera 13, the x-axis of the reference plane RP and the x-axis on the picked up image match, and thus, the transformation formula (5) or (6) is transformed into a general solution for a case where the tilt angle of the camera 13, the x-axis of the reference plane RP and the x-axis on the picked up image do not match. It is assumed that the tilt direction of the camera 13 is β with respect to the reference plane RP as shown in FIG. 7, and γ on the picked up image as shown in FIG. 8.

In order to transform a coordinate (X, Y) on the picked up image into a coordinate (x, y) on the reference plane RP using the transformation formula (6), the tilt direction of the camera 13 must be 0 degree (that is, in the position direction of the X-axis), and for this reason, a −γ rotation process is carried out with respect to (X, Y) as may be seen from the following formula (7).

$$\begin{pmatrix} X' \\ Y' \end{pmatrix} = \begin{pmatrix} \cos(-\gamma) & -\sin(-\gamma) \\ \sin(-\gamma) & \cos(-\gamma) \end{pmatrix} \begin{pmatrix} X \\ Y \end{pmatrix} \quad (7)$$

In a (X', Y') space above, it may be regarded that the camera 13 is tilted in the positive direction of the X'-axis, and the transformation formula (6) can be applied. Hence, the tilt can be transformed according to the following formula (8).

$$\begin{pmatrix} x' \\ y' \end{pmatrix} = \frac{1}{1\cos\alpha + X'\sin\alpha} \begin{pmatrix} X' \\ Y'\cos\alpha \end{pmatrix} \quad (8)$$

A (x, y) space in the left term of the formula (8) is not the original (x, y) space but is a coordinate system rotated by the angle β. In order to return the coordinate system to the original (x, y) coordinate system, a −β rotation process with respect to the coordinate system, that is, a +β rotation process with respect to the coordinates is necessary, as may be seen from the following formula (9).

$$\begin{pmatrix} x \\ y \end{pmatrix} = \begin{pmatrix} \cos\beta & -\sin\beta \\ \sin\beta & \cos\beta \end{pmatrix} \begin{pmatrix} x' \\ y' \end{pmatrix} \quad (9)$$

Accordingly, it is possible to transform the (X, Y) coordinate system into the (x, y) coordinate system by successively applying the formulas (7) through (9) described above.

In the description given above it is assumed that the coordinates on the picked up image are continuous values and the scale is 1:1 with respect to the reference plane RP. However, in a case where the picked up image to be treated is described by digital image data, the picked up image is represented by a collection of pixels (picture elements), and the image data are formed by pixel data.

Figure 9:
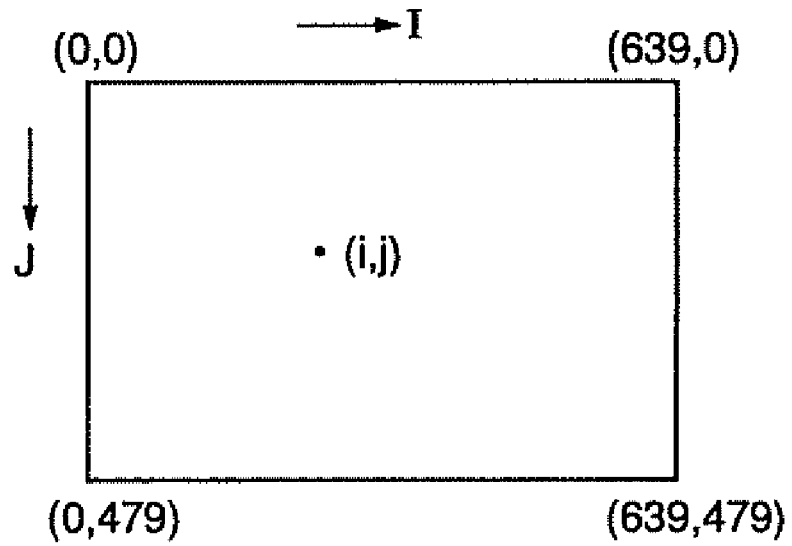
FIG. 9 is a diagram for explaining coordinates of the picked up image.

For example, suppose that one picked up image is represented by a two-dimensional array of 640×480 pixels, and dp denotes an actual distance on the reference plane RP corresponding to a distance between two mutually adjacent pixels. In this case, if coordinates of the picked up image are denoted by (I, J) as shown in FIG. 9, and considerations are given on the fact that j is defined with a direction opposite to the usual Y-axis and a center of the picked up image is (319.5, 239.5), pixel coordinates (I, J) corresponding to a point (X, Y) can be described by the following formula (10).

$$\begin{pmatrix} X \\ Y \end{pmatrix} = \begin{pmatrix} I - 319.5 \\ 239.5 - J \end{pmatrix} dp \quad (10)$$

Similarly, pixel coordinates (i', j') corresponding to a point (x, y) can be described by the following formula (11), where i' and j' denote real numbers which are not necessarily integers.

$$\begin{pmatrix} x \\ y \end{pmatrix} = \begin{pmatrix} i' - 319.5 \\ 239.5 - j' \end{pmatrix} dp \quad (11)$$

Accordingly, by successively carrying out the inverse transformation of the formulas (10)→(7)→(8)→(9)→(11), it is possible to transform the coordinate system (I, J) into the coordinate system (i', j'). In order to make the conversion result the same as the original image, having pixels arranged in a lattice, i and j may be regarded as integers and a pixel value of a point (i', j') in a neighborhood of a point (i, j), that is, a pixel value of a point (I, J) may be employed. In order to improve the accuracy of the image having the pixels arranged in the lattice, it is conceivable to obtain a weighted average of a plurality of neighboring points, but it is difficult to perform such a calculation.

Hence, an inverse transformation to the above transformation, that is, a transformation from the (i, j) coordinate system to a (I', J') coordinate system is carried out, and the accuracy of the image having the pixels arranged in the lattice may be improved by regarding a weighted average of 4 points neighboring the point (I', J') as a pixel value of the point (i, j). In this case, the formula (11) is described by the integers i and j, and thus, the pixel coordinates (i, j) corresponding to the point (x, y) can be described by the following formula (11A).

$$\begin{pmatrix} x \\ y \end{pmatrix} = \begin{pmatrix} i - 319.5 \\ 239.5 - j \end{pmatrix} dp \quad (11A)$$

From the inverse transformations of the formulas (11A) and (9) described above, the −β rotation process can be described by the following formula (12).

$$\begin{pmatrix} x' \\ y' \end{pmatrix} = \begin{pmatrix} \cos(-\beta) & -\sin(-\beta) \\ \sin(-\beta) & \cos(-\beta) \end{pmatrix} \begin{pmatrix} i - 319.5 \\ 239.5 - j \end{pmatrix} dp \quad (12)$$

The inverse transformation of the formula (8) can be written as the following formula (13) using the formula (5), to carry out the transformation of the tilt.

$$\begin{pmatrix} X' \\ Y' \end{pmatrix} = \frac{1}{1 - x'\sin\alpha} \begin{pmatrix} x' \cos\alpha \\ y' \end{pmatrix} \quad (13)$$

From the inverse transformation of the formula (7) above, a γ rotation can be described by the following formula (14).

$$\begin{pmatrix} X \\ Y \end{pmatrix} = \begin{pmatrix} \cos\gamma & -\sin\gamma \\ \sin\gamma & \cos\gamma \end{pmatrix} \begin{pmatrix} X' \\ Y' \end{pmatrix} \quad (14)$$

In addition, the inverse transformation of the formula (10) can be obtained from the following formula (15).

$$\begin{pmatrix} I' \\ J' \end{pmatrix} = \begin{pmatrix} 319.5 + X/dp \\ 239.5 - Y/dp \end{pmatrix} \quad (15)$$

Figure 10:
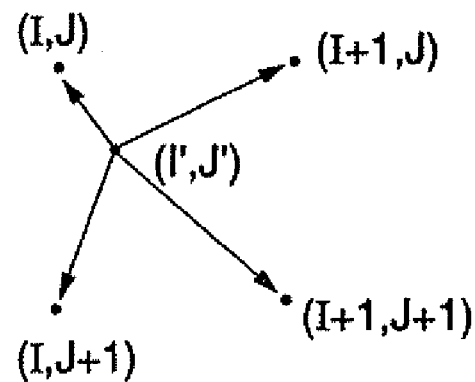
FIG. 10 is a diagram showing coordinates of 4 pixels actually existing in neighborhoods of a coordinate (I', J')

By successively calculating the formulas (12) through (15), it is possible to obtain the coordinates (I', J') before the transformation and corresponding to the coordinates (i, j) of the image after the transformation, where I' and J' are real numbers. If the 4 pixel coordinates actually existing in the neighborhood of the coordinates (I', J') are (I, J), (I+1, J), (I, J+1) and (I+1, J+1) as shown in FIG. 10, I and J can be obtained from the following formula (16), where [ ] denotes a Gauss symbol.

$$\begin{pmatrix} I \\ J \end{pmatrix} = \begin{pmatrix} [I'] \\ [J'] \end{pmatrix} \quad (16)$$

In this case, if the pixel value (luminance value) of the original image is denoted by P(I, J) and the pixel value (luminance value) after the transformation is denoted by p(i, j), a weighted average of the neighboring 4 pixel values can be described by the following formula (17).

$$p(i,j) = (I+J-J')\{(I+I-I')P(I, J)+(I'-I)P(I+1, J)\}+(J'-J)\{(I+I-I')P(I, J+1)+(I'-I)P(I+1, J+1)\} \quad (17)$$

The formulas (12) through (15) are general solutions, but in cases where the tilt direction of the camera 13 is 0 degree (or 180 degrees) or 90 degrees (or 270 degrees), the formulas can be simplified. In the case where the tilt direction of the camera 13 is 0 degree (or 180 degrees), β=0, and the following formula (12A) may be used in place of the formula (12). In addition, in the case where the optical axis of the camera 13 is perpendicular to the reference plane RP and the camera 13 is simply tilted in the +x-direction or the −x-direction, γ=0 if there is no rotation of the camera 13 about the optical axis, and the formula (14) may be simplified.

$$\begin{pmatrix} x' \\ y' \end{pmatrix} = \begin{pmatrix} i - 319.5 \\ 239.5 - j \end{pmatrix} dp \qquad (12A)$$

Moreover, in the case where the tilt direction of the camera 13 is 90 degrees (or 270 degrees), x and y in the formula (13) may be interchanged and treated similarly to the case where the tilt direction of the camera 13 is 0 degree (or 180 degrees), so as to simplify the formula (13). More particularly, the formula (12A) may be used in place of the formula (12), and the following formula (13A) may be used in place of the formula (13). Furthermore, the formula (14) may be simplified in a simple case where γ=0, similarly as described above.

$$\begin{pmatrix} X' \\ Y' \end{pmatrix} = \frac{1}{1 - y' \sin\alpha} \begin{pmatrix} x' \\ y' \cos\alpha \end{pmatrix} \qquad (13A)$$

Figure 11:
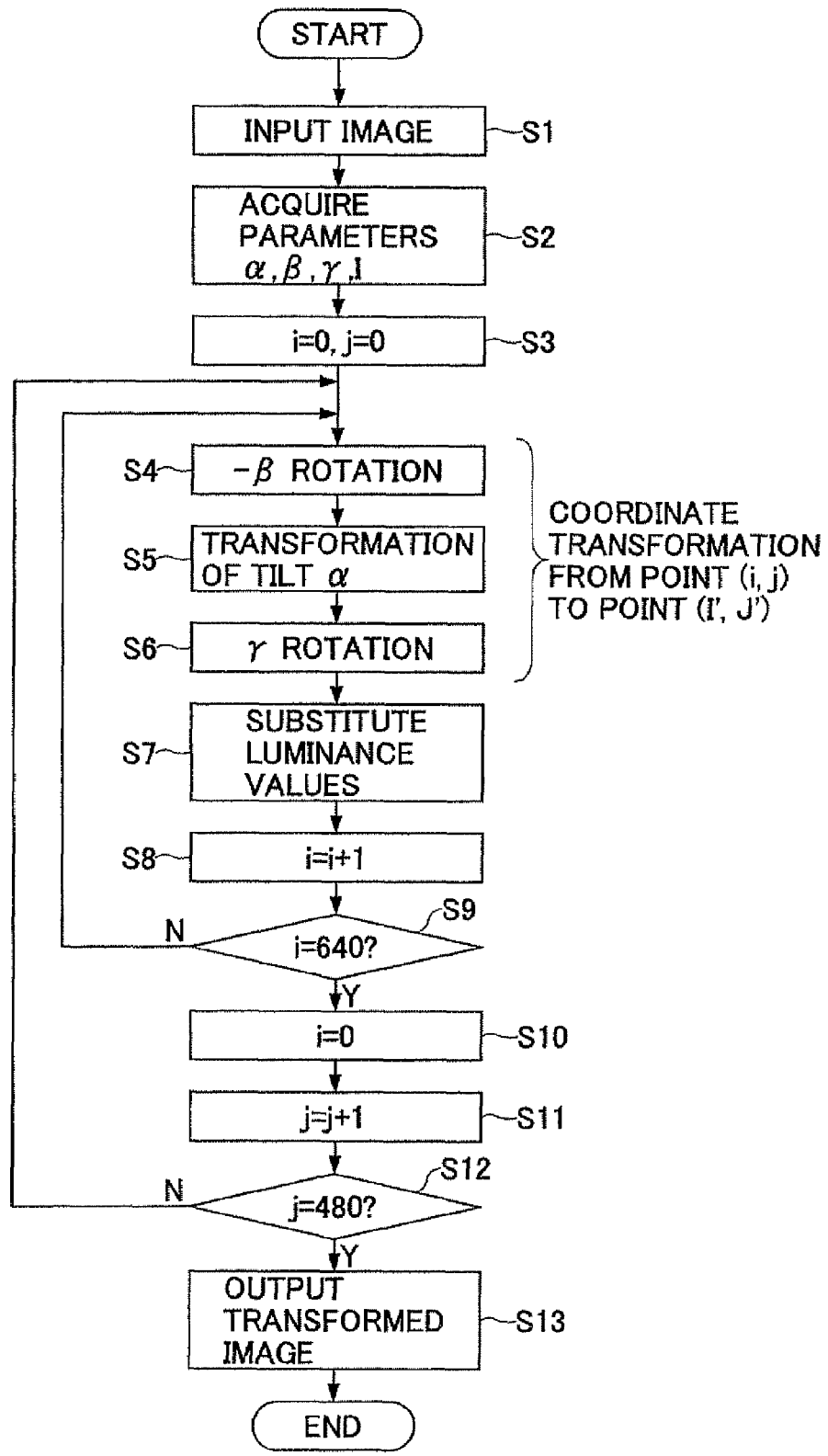
FIG. 11 is a flow chart for explaining an operation of an image transformation part.

FIG. 11 is a flow chart for explaining the operation of the image transformation part 2. The process shown in FIG. 11 may be carried out by an exclusive hardware made up of a processor or the like forming the image transformation part 2 or, carried out by a software which realizes the functions of the image transformation part 2 by the processor that forms the control part 1.

In FIG. 11, a step S1 inputs the image data of the image that is picked up by the camera 13, and temporarily stores the image data in the memory within the control part 1, for example. A step S2 acquires parameters α, β, γ and I described above. The parameters (angles) α, β and γ may be obtained by a method which will be described later. In addition, by presetting a reference distance $I_{ref}$ with respect to a reference position where the optical axis of the camera 13 becomes perpendicular with respect to the reference plane RP such as the stage 31, the parameter (distance) I can be obtained based on a moving quantity from the reference distance $I_{ref}$. A step S3 initially sets i and j to i=0 and j=0.

Steps S4 through S6 carry out a coordinate transformation process from the point (i, j) to the point (I', J'). More particularly, the step S4 uses the formula (12) described above to carry out a −β rotation process, the step S5 uses the formula (13) to carry out a tilt transformation process, and the step S6 uses the formula (14) to carry out a γ rotation process.

Figure 12:
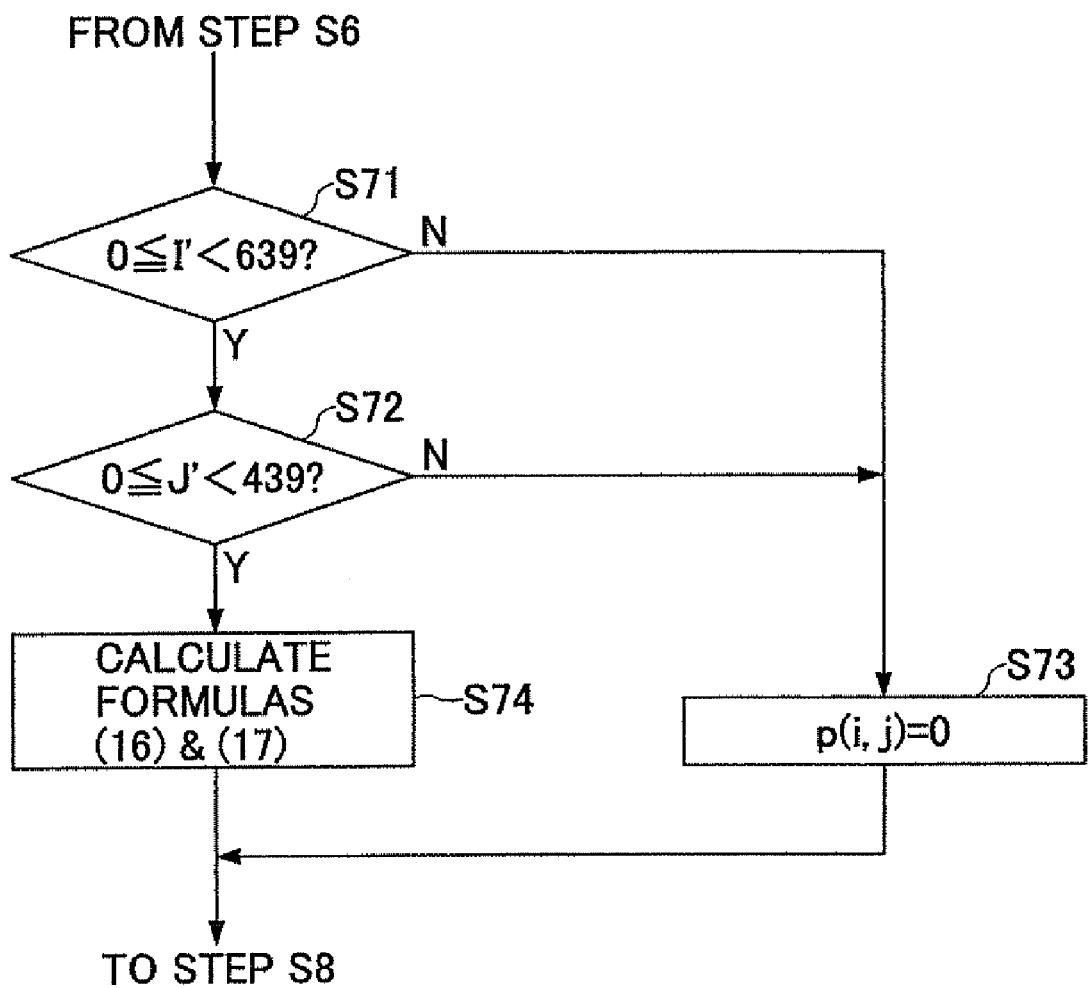
FIG. 12 is a flow chart for explaining a luminance value substituting process.

The step S7 carries out a luminance value substituting process. FIG. 12 is a flow chart for explaining the luminance value substituting process of the step S7. If it is assumed for the sake of convenience that the result of the coordinate transformation process of the steps S4 through S6 shown in FIG. 11 is (I', J'), a step S71 shown in FIG. 12 decides whether or not 0≦I'<639. If the decision result in the step S71 is YES, a step S72 decides whether or not 0≦J'<439. If the decision result in the step S71 or S72 is NO, a step S73 sets P(i, j) to P(i, j)=0, and the process advances to a step S8 shown in FIG. 11. On the other hand, if the decision result in the step S72 is YES, a step S74 calculates the formulas (16) and (17) described above, and the process advances to the step S8.

Returning now to the description of FIG. 11, the step S8 increments i to i=i+1, and a step S9 decides whether or not i=640. If the decision result in the step S9 is NO, the process returns to the step S4. On the other hand, if the decision result in the step S9 is YES, a step S10 sets i to i=0. A step S11 increments j to j=j+1, and a step S12 decides whether or not j=480. If the decision result in the step S12 is NO, the process returns to the step S4. If the decision result in the step S12 is YES, a step S13 outputs the image data of the transformed image, that is, a transformed image data, and the process ends. The transformed image data is stored in the memory within the control part 1, for example, and is used for the image recognition by the image recognition part 3.

Figure 13:
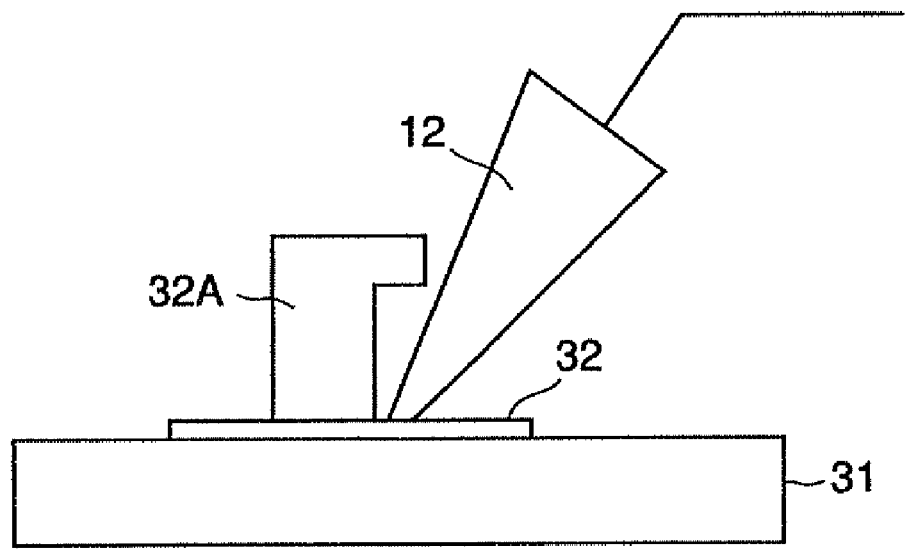
FIG. 13 is a diagram for explaining a case where a hand is tilted.
Figure 14:
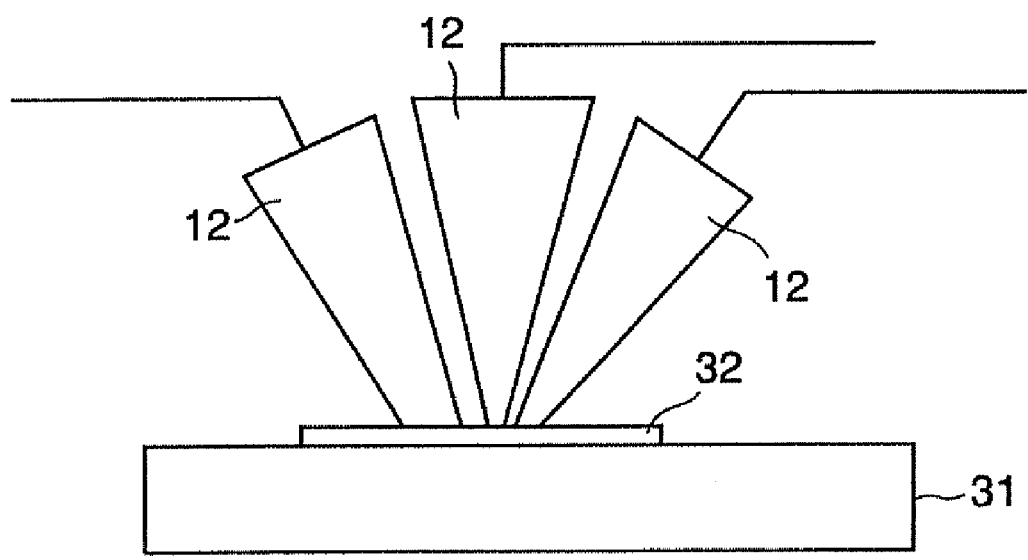
FIG. 14 is a diagram for explaining a case where a plurality of hands are tilted.

As described above, the image recognition part 3 itself may employ known structure and algorithm, but is characterized in that the image recognition is carried out based on the transformed image obtained by the image transformation part 2. By carrying out a pattern matching or a template matching, for example, in the image recognition part 3 based on the transformed image data, it is possible to accurately obtain the position of the hand 12 with respect to the object 32, that is, the position of the pins 14 in this embodiment. Accordingly, as shown in a simplified manner in FIG. 13, it becomes possible to tilt the hand 12 and move the tip end above the electrode of the object 32, for example, so that the hand 12 will not hit an obstructing object 32a on the object 32. In addition, as shown in a simplified manner in FIG. 14, in a case where a plurality of hands 12 are provided, it is possible to avoid interference among the hands 12 by tilting the hands 12.

In the image transformation process described above, the image which is picked up in a state where the camera 13 is tilted with respect to the reference plane RP is transformed into the transformed image which is as if the transformed image were picked up from a position perpendicular with respect to the reference plane RP. Accordingly, in a case where the original shape in the plane is a rectangle shown in FIG. 15(a), the shape within the image picked up by the camera 13 is a trapezoid shown in FIG. 15(b), but the shape within the transformed image after the image transformation process is a rectangle shown in FIG. 15(c) which would enable an accurate image recognition process to be carried out.

Therefore, by carrying out a reverse image transformation process to the image transformation process described above, the present invention may also be applied to the image projection apparatus such as a projector. For example, if the image projection apparatus is not set up at a position such that the optical axis of the image projection apparatus is perpendicular to a screen, the rectangular image shown in FIG. 16(a) which should originally be projected on the screen becomes a trapezoidal image shown in FIG. 16(b). In the trapezoidal image shown in FIG. 16(b), a distortion is generated and the considerable deterioration of the picture quality makes the image on the screen very awkward, unnatural and sometimes unpleasant to the viewer. Accordingly by carrying out the image transformation process which is in reverse to the image transformation process described above, the original rectangular image shown in FIG. 17(a) can be transformed into a trapezoidal image shown in FIG. 17(b) and projected on the screen, so that a rectangular image shown in FIG. 17(c) having no distortion and a high picture quality is actually projected on the screen and visible by the viewer A description will now be given of the reverse image transformation process. In the case of the reverse image transformation process, the following formulas (18) through (20) are used in place of the formulas (7) through (9) described above. A −β rotation process is carried out by using the formula (18), a tilt transformation (inverse transformation) process is carried out using the formula (19), and a γ rotation process is carried out using the formula (20). It is assumed for the sake of convenience that the image projection apparatus is tilted from a state separated by a distance I in a direction perpendicular to the screen (reference plane RP).

$$\begin{pmatrix} x' \\ y' \end{pmatrix} = \begin{pmatrix} \cos(-\beta) & -\sin(-\beta) \\ \sin(-\beta) & \cos(-\beta) \end{pmatrix} \begin{pmatrix} x \\ y \end{pmatrix} \quad (18)$$

$$\begin{pmatrix} X' \\ Y' \end{pmatrix} = \frac{1}{1 - x'\sin\alpha} \begin{pmatrix} x'\cos\alpha \\ y' \end{pmatrix} \quad (19)$$

$$\begin{pmatrix} X \\ Y \end{pmatrix} = \begin{pmatrix} \cos\gamma & -\sin\gamma \\ \sin\gamma & \cos\gamma \end{pmatrix} \begin{pmatrix} X' \\ Y' \end{pmatrix} \quad (20)$$

When carrying out such a reverse image transformation process, in a case where the image to be treated is described by digital image data, the image is represented by a collection of pixels (picture elements), and the image data are formed by pixel data. Hence, the calculation may be made similarly to the case of the image transformation process described above, but in an opposite direction, so as to obtain a weighted average of the pixel values of 4 pixels neighboring the corresponding pixel of the original image.

For example, a $-\gamma$ rotation process may be carried out using the following formula (21), a tilt transformation process may be carried out using the following formula (22), a $\beta$ rotation process may be carried out using the following formula (23), a transformation process to the pixel coordinates may be carried out using the following formula (24), an integer process may be carried out using the following formula (25), and a pixel value setting process may be carried out using the following formula (26).

$$\begin{pmatrix} X' \\ Y' \end{pmatrix} = \begin{pmatrix} \cos(-\gamma) & -\sin(-\gamma) \\ \sin(-\gamma) & \cos(-\gamma) \end{pmatrix} \begin{pmatrix} I - 319.5 \\ 239.5 - J \end{pmatrix} dp \quad (21)$$

$$\begin{pmatrix} x' \\ y' \end{pmatrix} = \frac{1}{l\cos\alpha + X'\sin\alpha} \begin{pmatrix} X' \\ Y'\cos\alpha \end{pmatrix} \quad (22)$$

$$\begin{pmatrix} x \\ y \end{pmatrix} = \begin{pmatrix} \cos\beta & -\sin\beta \\ \sin\beta & \cos\beta \end{pmatrix} \begin{pmatrix} x' \\ y' \end{pmatrix} \quad (23)$$

$$\begin{pmatrix} i' \\ j' \end{pmatrix} = \begin{pmatrix} 319.5 + x/dp \\ 239.5 - y/dp \end{pmatrix} \quad (24)$$

$$\begin{pmatrix} i \\ j \end{pmatrix} = \begin{pmatrix} [i'] \\ [j'] \end{pmatrix} \quad (25)$$

$$p(I, J) = (1 + j - j')\{(1 + i - i')P(i, j) + (i' - i)P(i+1, j)\} + \quad (26)$$
$$(j' - j)\{(1 + i - i')P(i, j+1) + (i' - i)P(i+1, j+1)\}$$

By successively calculating the formulas (21) through (26), it is possible to carry out the reverse image transformation process with respect to the image that is formed by 640×480 pixels.

In the case of the image projection apparatus, the calculation may be simplified if the optical axis of the image projection apparatus is tilted with respect to the screen in only one of the vertical and horizontal directions (up-and-down direction and right-and-left direction) of the screen.

Figure 18:
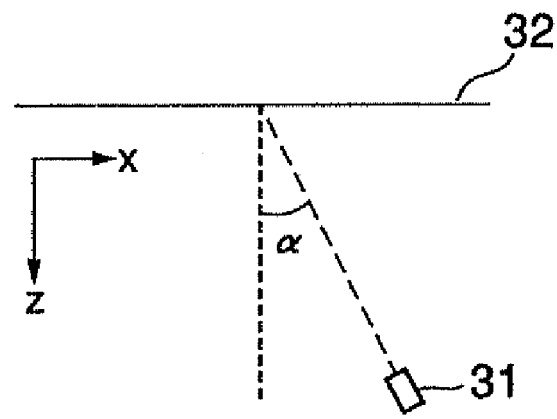
FIG. 18 is a diagram for explaining a case where the image projection apparatus is tilted to a right side of the screen.

For example, in a case where an image projection apparatus 31 is tilted by an angle $\alpha$ to the right side of a screen 32 as shown in FIG. 18, $\beta=\gamma=0$ may be set in the formulas (21) through (26) described above, and thus, the following formulas (21A), (22) and (24A) may be calculated in place of the formulas (21) through (24). In the case where the image projection apparatus 31 is tilted by the angle $\alpha$ to the left side of the screen 32, the angle $\alpha$ may be set to a negative value, and thus, the formulas (21A), (22A) and (24A) may be calculated instead. The formula (22A) is the same as the formula (22).

$$\begin{pmatrix} X' \\ Y' \end{pmatrix} = \begin{pmatrix} I - 319.5 \\ 239.5 - J \end{pmatrix} dp \quad (21A)$$

$$\begin{pmatrix} x' \\ y' \end{pmatrix} = \frac{1}{l\cos\alpha + X'\sin\alpha} \begin{pmatrix} X' \\ Y'\cos\alpha \end{pmatrix} \quad (22A)$$

$$\begin{pmatrix} i' \\ j' \end{pmatrix} = \begin{pmatrix} 319.5 + x'/dp \\ 239.5 - y'/dp \end{pmatrix} \quad (24A)$$

Figure 19:
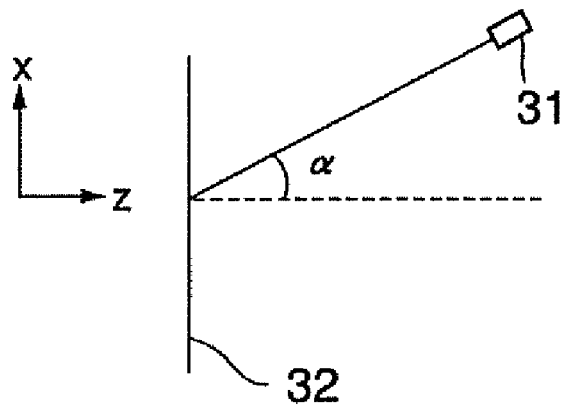
FIG. 19 is a diagram for explaining a case where the image projection apparatus is tilted to a top side of the screen.

For example, in a case where an image projection apparatus 31 is tilted by an angle $\alpha$ to the upper side of the screen 32 as shown in FIG. 19, the x and y in the formulas used for the tilt transformation process are interchanged so as to omit the transformation of $\beta$ and $\gamma$ in the formulas (21) through (26) described above, and thus, the following formulas (21B), (22B) and (24B) may be calculated in place of the formulas (21) through (24). In the case where the image projection apparatus 31 is tilted by the angle $\alpha$ to the lower side of the screen 32, the angle $\alpha$ may be set to a negative value, and thus, the formulas (21B), (22B) and (24B) may be calculated instead. The formula (24B) is the same as the formula (24A).

$$\begin{pmatrix} X' \\ Y' \end{pmatrix} = \begin{pmatrix} I - 319.5 \\ 239.5 - J \end{pmatrix} dp \quad (21B)$$

$$\begin{pmatrix} x' \\ y' \end{pmatrix} = \frac{1}{l\cos\alpha + Y'\sin\alpha} \begin{pmatrix} X'\cos\alpha \\ Y' \end{pmatrix} \quad (22B)$$

$$\begin{pmatrix} i' \\ j' \end{pmatrix} = \begin{pmatrix} 319.5 + x'/dp \\ 239.5 - y'/dp \end{pmatrix} \quad (24B)$$

Figure 20:
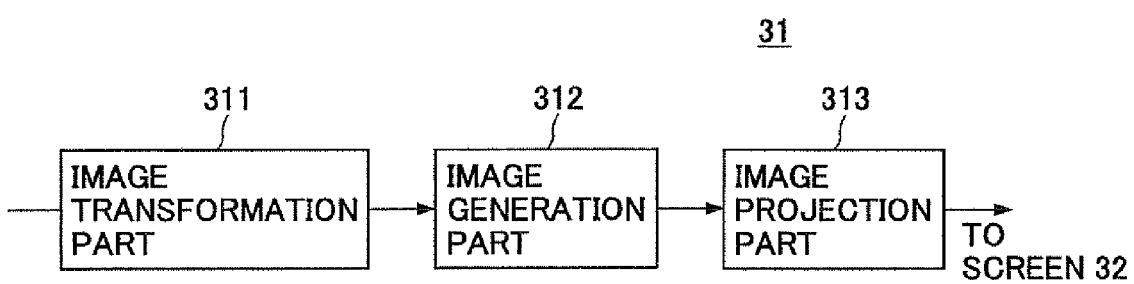
FIG. 20 is a system block diagram showing a structure of an embodiment of the image projection apparatus.

FIG. 20 is a system block diagram showing a structure of an embodiment of the image projection apparatus according to the present invention. The image projection apparatus 31 shown in FIG. 20 includes an image transformation part 311, an image generation part 312 and an image projection part 313. Image data output from a television tuner, image data output from an image pickup means (or imaging means) such as a camera, image data reproduced from a recording medium by a reproducing apparatus, image data of an image read by an image reading apparatus, or the like are input to the image transformation part 311. With respect to the input image data, the image transformation part 311 carries out a reverse image transformation process which is in reverse to the image transformation process of the image transformation part 2 shown in FIG. 2, based on the parameters $\alpha$, $\beta$ and $\gamma$. The image generation part 312 generates an image based on the transformed image data output from the image transformation part 311. The image projection part 313 includes an optical system for projecting the image output from the image generation part 312 onto the screen 32. The image generation part 312 and the image projection part 313 may respectively be formed by an image generation part and an image projection part having known structures.

In the image transformation process carried out by the image transformation part 2 shown in FIG. 1 and the reverse image transformation process carried out by the image transformation part 311 shown in FIG. 20, the number of pixels of the image before the transformation and the number of pixels of the image after the transformation may be the same. In such a case, in the image after the transformation, a portion of a peripheral part of the image before the transformation may project outside the image region. If an object to be recognized does not exist in the peripheral part of the image, no problem is encountered even when the image recognition process is carried out based on the image which has been subjected to the image transformation process of the image transformation part 2. But when projecting onto the screen 32 the image which has been subjected to the reverse transformation process of the image transformation part 311, the projected image does not become the original rectangular shape with a dimension such as 3×4 or 9×16 in arbitrary units, and the projected image may took slightly awkward, unnatural or unpleasant to the viewer.

Figure 21:
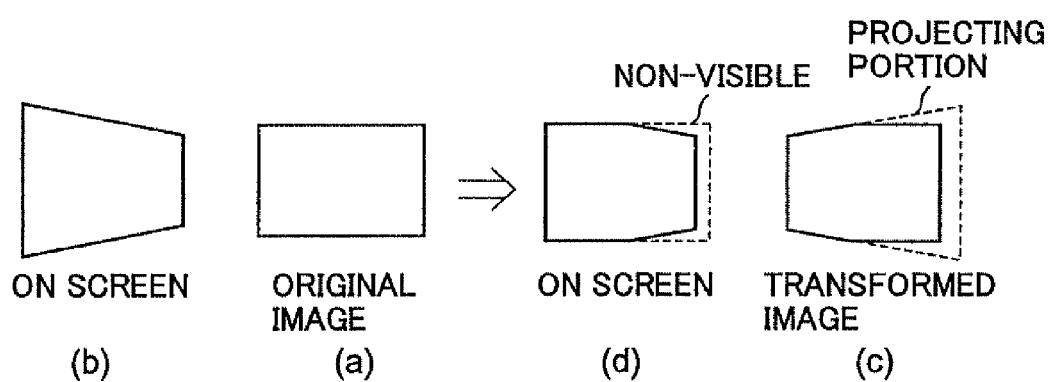
FIG. 21 is a diagram for explaining images projected on the screen.

FIG. 21 is a diagram for explaining the image that is projected on the screen 32 when the image projection apparatus 31 projects the image after the transformation onto the screen 32 from the right side of the screen 32. FIG. 21(a) shows the original image, FIG. 21(b) shows the image that is projected on the screen 32 when no image transformation process is carried out, and FIG. 21(c) shows the image after the transformation, with the peripheral part of the original image projecting outside the image region indicated by broken lines. When this image after the transformation is projected on the screen 32, an image shown in FIG. 21(d) is projected, and the peripheral part of the original image will not be projected as may be seen by the broken lines. When the angles β and γ have arbitrary values, the image that is projected is further subjected to rotation, and an image portion that is actually not projected on the screen 32 becomes even more complex.

In this case, it is possible to make the image after the transformation easier to see and appear more natural to the viewer, by employing one of the following methods. According to a first method, the number of pixels of the image after the transformation is set larger than the number of pixels of the image before the transformation. For example, if the number of pixels of the image before the transformation is 640×480, the number of pixels of the image after the transformation is set to 1024×1024. According to a second method, the image before the transformation is once reduced, and the image transformation process is carried out in a state where a margin is provided at the peripheral part of the reduced image. in the case of this second method, the margin becomes the only peripheral part projecting outside the image region in the image after the transformation, and all of the information of the original image is included in the image after the transformation.

Next, a description will be given of a method of obtaining the parameters (angles) α, β and γ. The preconditions for carrying out the image transformation process described above are that the tilt angle α of the camera 13, the tilt direction β of the camera 13, and the tilt direction γ of the camera on the picked up image have been obtained. In the case of the image projection apparatus 31, the accuracy required of the parameters (angles) α, β and γ is relatively moderate, and the parameters (angles) α, β and γ may be determined based on eye measurement. In addition, since the image projection apparatus 31 is usually not set by rotating the image projection apparatus 31 about its optical axis, it may be assumed that γ is approximately equal to β. Accordingly, the parameters α and β may be determined by eye measurement, using a protractor and the like. Although the parameters γ and β are not equal to be precise, no particularly big problem will occur in the case of the image transformation process in the image projection apparatus 31 even if the parameters γ and β are approximated as being approximately equal.

On the other hand, in a case where the image after the transformation is used for the image recognition process to accurately detect the position of a target object, for example, even a slight image distortion greatly affects the position detection accuracy. Hence, in such a case, it is required that the parameters α, β and γ are set to accurate values. Next, a description will now be given of a method of obtaining the parameters α, β and γ, in order to set the parameters α, β and γ to accurate values.

Figure 22:
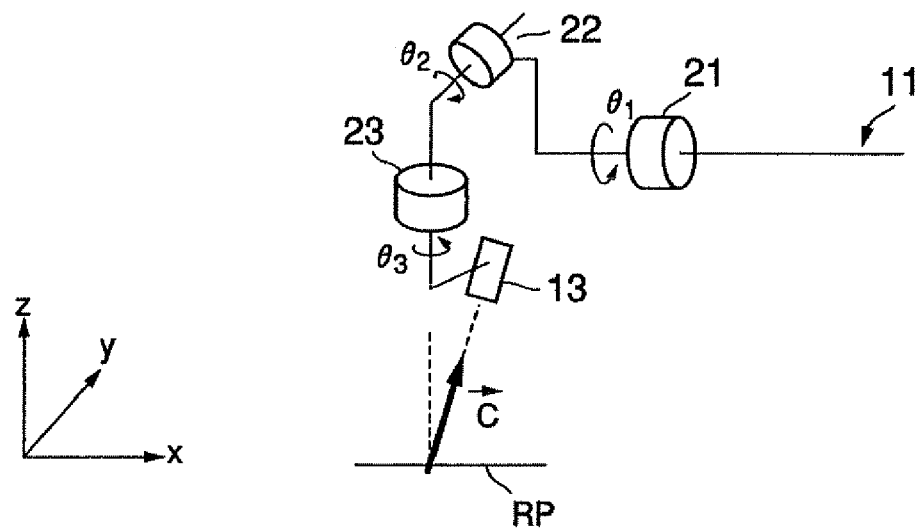
FIG. 22 is a diagram showing a case where the hand is driven with respect to an arm by 3 motors.

FIG. 22 is a diagram showing a case where the hand 12 (not shown) is driven with respect to the arm 11 by 3 motors 21 through 23, as in the case of the robot shown in FIG. 2. In FIG. 22, those parts which are the same as those corresponding parts in FIG. 22 are designated by the same reference numerals, and a description thereof will be omitted.

In FIG. 22, an angle θ1 is parallel to the x-axis, an angle θ2 is parallel to the y-axis and an angle θ3 is parallel to the z-axis, at a reference position of the camera 13. A position where the angle θ3 is perpendicular with respect to the reference plane RP will be regarded as a home position. When a tilt unit vector of the camera 13 at this home position is denoted by C* and a simple case is supposed, the optical axis of the camera 13 is also perpendicular to the reference plane RP, and the following formula stands.

$$C* = \begin{pmatrix} 0 \\ 0 \\ 1 \end{pmatrix}$$

The unit vector C* is described by the following formula (27) in order to permit an arbitrary orientation. A unit vector C⊥* in the positive direction of the y-axis on the image picked up by the camera 13 is described by the following formula (28), where the unit vectors C* and C⊥* are mutually perpendicular vectors.

$$C* = \begin{pmatrix} a \\ b \\ c \end{pmatrix} \tag{27}$$

$$C\perp* = \begin{pmatrix} a_\perp \\ b_\perp \\ c_\perp \end{pmatrix} \tag{28}$$

The orientation of the unit vectors C* and C⊥* changes depending on the values of the angles θ1, θ2 and θ3, that is, the rotations of the motors 21, 22 and 23. When new vectors C'* and C⊥'* are defined by the following formulas (29) and a 3×3 matrix A is defined by the following formula (30), the following formulas (31) and (32) can be obtained.

$$C'* = \begin{pmatrix} a_s \\ b_s \\ c_s \end{pmatrix}, \quad C\perp'* = \begin{pmatrix} a_{\perp s} \\ b_{\perp s} \\ c_{\perp s} \end{pmatrix} \tag{29}$$

-continued $$A = \begin{pmatrix} 1 & 0 & 0 \\ 0 & \cos\theta1 & -\sin\theta1 \\ 0 & \sin\theta1 & \cos\theta1 \end{pmatrix} \begin{pmatrix} \cos\theta2 & 0 & \sin\theta2 \\ 0 & 1 & 0 \\ -\sin\theta2 & 0 & \cos\theta2 \end{pmatrix} \begin{pmatrix} \cos\theta3 & -\sin\theta3 & 0 \\ \sin\theta3 & \cos\theta3 & 0 \\ 0 & 0 & 1 \end{pmatrix} \quad (30)$$

$$\begin{pmatrix} a_s \\ b_s \\ c_s \end{pmatrix} = A \begin{pmatrix} a \\ b \\ c \end{pmatrix} \quad (31)$$

$$\begin{pmatrix} a_{\perp s} \\ b_{\perp s} \\ c_{\perp s} \end{pmatrix} = A \begin{pmatrix} a_{\perp} \\ b_{\perp} \\ c_{\perp} \end{pmatrix} \quad (32)$$

Figure 23:
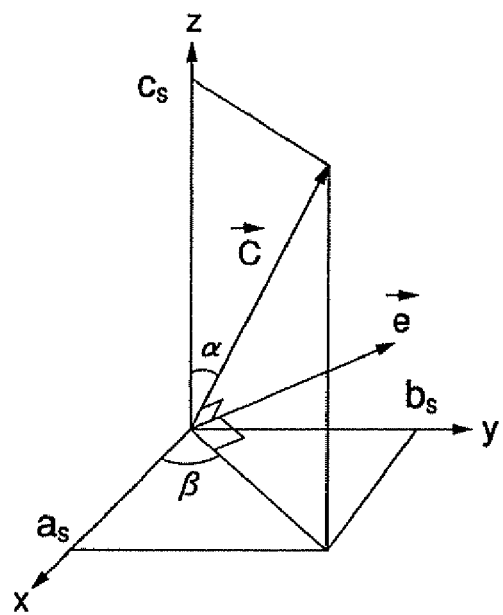
FIG. 23 is a diagram for explaining a relationship of vectors.

FIG. 23 is a diagram for explaining a relationship of the vectors. As may be seen from FIG. 23, the angles α and β can be obtained from the following formulas (33).

$$\alpha = \tan^{-1}\{(a_s^2 + b_s^2)^{1/2}/c_s\}$$

$$\beta = \tan^{-1}(b_s/a_s) \quad (33)$$

The angle γ can be obtained in the following manner. First, a vector e*=(−sin β, cos β, 0) that is perpendicular to a vector (cos β, sin β, 0) in the tilt direction and parallel to the xy plane is considered. This vector e* is also perpendicular to the vector C'*. In addition, when the orientation of the vector (cos β, sin β, 0) is regarded as being the positive direction of the x-axis, the orientation of the vector e* becomes the positive direction of the y-axis.

As described above, the orientation of the vector C⊥* is defined as being the positive direction of the y-axis of the camera 13. Hence, by rotating the camera 13 about its optical axis so that the vector C⊥'* matches the vector e*, the positive direction of the x-axis on the picked up image will match the direction in which the vector C'* is tilted. This indicates that the angle formed by the vectors C'* and e* is γ, and the following formula stands.

$$(C\perp'^* \times e^*) \cdot C'^* = (\sin\gamma \cdot C'^*) \cdot C'^* = \sin\gamma$$

The left term of the above formula can be rewritten as follows, and thus, sin γ can be obtained from the following formula (34).

$$\begin{aligned} \text{Left Term} &= (-c_{\perp s}\cos\beta e_x * - c_{\perp s}\sin\beta e_y * - \\ & (a_{\perp s}\cos\beta + b_{\perp s}\sin\beta)e_z *) \cdot (a_s e_x * + \\ & b_s e_y * + c_s e_z *) \\ &= -a_s c_s \cos\beta - b_s c_{\perp s}\sin\beta + c_s(a_{\perp s}\cos\beta + b_{\perp s}\sin\beta) \\ \sin\gamma &= -a_s c_{\perp s}\cos\beta - b_s c_{\perp s}\sin\beta + c_s(a_{\perp s}\cos\beta + b_{\perp s}\sin\beta) \end{aligned} \quad (34)$$

Figure 24:
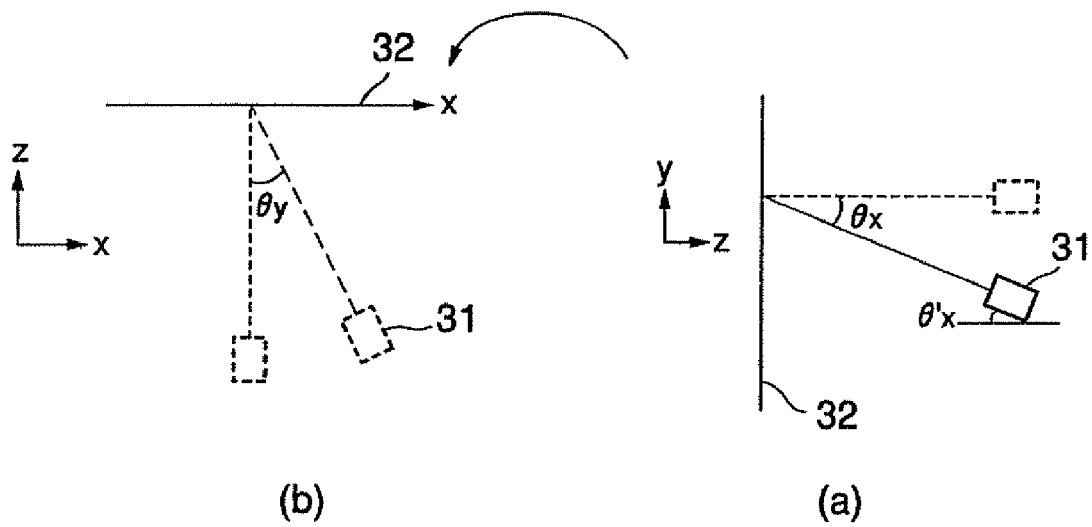
FIG. 24 is a diagram for explaining a case where the image projection apparatus is tilted upwards by an angle θx and tilted rightwards by an angle θy with respect to the screen.

In the case of the image projection apparatus 31, the angles α, β and γ can be obtained by the same calculation method. However, it is possible to obtain the angles α, β and γ by a simpler method. A description will now be given of this simpler method. FIG. 24 is a diagram for explaining a case where the image projection apparatus 31 is tilted upwards by an angle θx and is tilted rightwards by an angle θy, with respect to the screen 32. FIG. 24(a) shows a state where the image projection apparatus 31 is tilted upwards by the angle θx with respect to the screen 32, and FIG. 24(b) shows a state where the image projection apparatus 31 is tilted rightwards by the angle θy with respect to the screen 32.

Figure 25:
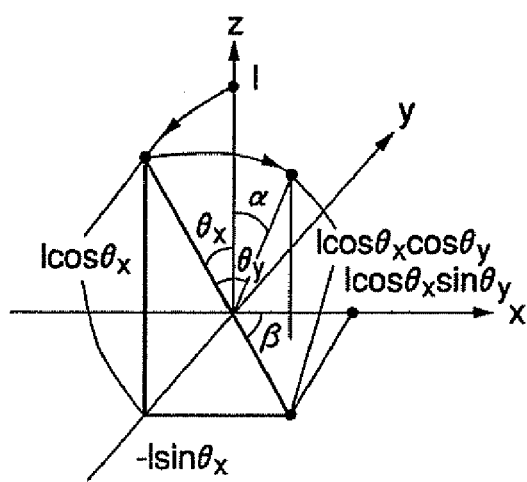
FIG. 25 is a diagram for explaining a relationship of various angles shown in FIG. 24.

FIG. 25 is a diagram for explaining a relationship of each of the angles for the case shown in FIG. 24. As may be seen from FIG. 25, the angles α and β can be obtained from the following formula (35).

$$\tan\beta = -\sin\theta x/(\cos\theta x \cdot \sin\theta y)$$

$$\cos\alpha = \cos\theta x \cdot \cos\theta y \quad (35)$$

With respect to the angle γ, γ=β may be regarded as being the approximate solution. An error of the angle γ can be corrected by manually adjusting the position of the image projection apparatus 31 so that the projected image that is actually projected on the screen 32 becomes horizontal. Hence, an error that is generated by assuming that γ=β does not introduce problems from the practical point of view.

The present inventor studied how accurate the angle γ can be approximated by substituting the angle β for the angle γ, by using the formula (34) described above. It was confirmed that if θ1 and θ2 or, θx and θy are within a range of approximately ±20 degrees, the error of the approximated angle γ falls within several degrees.

A viewer who watches the image on the screen or display may see from a direction that is oblique to the screen or display. In such a case, even if no image distortion is generated on the screen or display, a distorted image is imaged on the retina of the human eye by watching the screen or display from the direction that is oblique to the screen or display. In a case where the distortion of the image imaged on the retina is relatively small, the small distortion will be neglected by the functions of the human brain and will not be recognized. As a result, a circle having a small distortion will be recognized as a circle, and a square having a small distortion will be recognized as a square, for example.

However, when the angle at which the screen or display is viewed becomes large, the distortion also becomes large and the distortion becomes no longer negligible even by the functions of the human brain. Consequently, the large distortion becomes clearly visible by the human eyes. For example, when the image on a television display having an aspect ratio of 4:3 and the image on a television display having an aspect ratio of 16:9 are compared, the image on the television display having the aspect ratio of 16:9 is clearly expanded by approximately 33% in the horizontal direction, and the image will not appear unnatural in most cases where the image is related to a scenery or the like in which the aspect ratio is originally unclear. However, for other images, the horizontally expanded image on the television display having the aspect ratio of 16:9 appears unnatural in most cases. For example, a person who is standing may appear fat and the face of this person may appear rounder. Accordingly, when the viewer watches the screen or display from the direction that is oblique to the screen or display, it is also desirable to take measures so that the image distortion will not be recognized by the viewer.

Next, a description will be given of the image transformation process for correcting the image in a case where the viewer watches the screen or display that is displaying a distortion-free image from a direction oblique to the screen or display, and in a case where the image projection apparatus projects an image from the direction that is oblique to the screen and the viewer watches the screen from the direction that is oblique to the screen.

First, a description will be given of the case where the viewer watches the display from the direction that is oblique to the display. It is assumed that the image displayed on the display is distortion-free. This corresponds to a case where the image projection apparatus projects the image on the screen from a position where the optical axis of the image projection apparatus is perpendicular to the screen and the projected image on the screen is distortion-free. The display may be a known television display, for example, and a detailed description thereof will be omitted in this specification.

It is assumed that a relationship similar to the relationship between the camera 13 and the reference plane RP stands between the viewer and the display, and that corresponding parameters α', β', γ' and I' are used in place of the parameters α, β, γ and I described above. In other words, the image that is imaged on the retina of the human eye of the viewer, may be regarded as the image that is picked up by the camera 13. In this case, the following formulas (5A) and (6A) stand by replacing α by α' and replacing I by I' in the formulas (5) and (6) described above. Here, $(X_0, Y_0)$ indicates the coordinates of the original image, and $(x, y)$ indicates the coordinates after the transformation.

$$\begin{pmatrix} X_0 \\ Y_0 \end{pmatrix} = \frac{1'}{1' - x\sin\alpha'} \begin{pmatrix} x\cos\alpha' \\ y \end{pmatrix} \quad (5A)$$

$$\begin{pmatrix} x \\ y \end{pmatrix} = \frac{1'}{1'\cos\alpha' + X_0\sin\alpha'} \begin{pmatrix} X_0 \\ Y_0\cos\alpha' \end{pmatrix} \quad (6A)$$

The following formulas (7A) through (9A) stand by replacing α by α', replacing β by β' and replacing I by I' in the formulas (7) through (9) described above.

$$\begin{pmatrix} X_0' \\ Y_0' \end{pmatrix} = \begin{pmatrix} \cos(-\gamma') & -\sin(-\gamma') \\ \sin(-\gamma') & \cos(-\gamma') \end{pmatrix} \begin{pmatrix} X_0 \\ Y_0 \end{pmatrix} \quad (7A)$$

$$\begin{pmatrix} x' \\ y' \end{pmatrix} = \frac{1'}{1'\cos\alpha' + X_0'\sin\alpha'} \begin{pmatrix} X_0' \\ Y_0'\cos\alpha' \end{pmatrix} \quad (8A)$$

$$\begin{pmatrix} x \\ y \end{pmatrix} = \begin{pmatrix} \cos\beta' & -\sin\beta' \\ \sin\beta' & \cos\beta' \end{pmatrix} \begin{pmatrix} x' \\ y' \end{pmatrix} \quad (9A)$$

If the direction oblique with respect to the display is limited to the vertical direction (up-and-down direction) of the display or the horizontal direction (right-and-left direction) of the display, the calculation can of course be simplified by carrying out the calculation using the formulas (12A), (13), (14) and (15) or the calculation using the formulas (12A), (13A), (14) and (15) described above.

Next, a description will be given of a case where the viewer watches the screen 32 from a direction oblique to the screen 32. The image transformation process for a case where the image projection apparatus 31 projects the image on the screen 32 from a position where the optical axis of the image projection apparatus 31 is perpendicular to the screen 32 and the projected image on the screen 32 is distortion-free, may be the same as the image transformation process described above for the case where the viewer watches the display from the direction oblique to the display. On the other hand, in a case where the image projection apparatus 31 is also set up obliquely to the screen 32, the following image transformation process is carried out.

Figure 26:
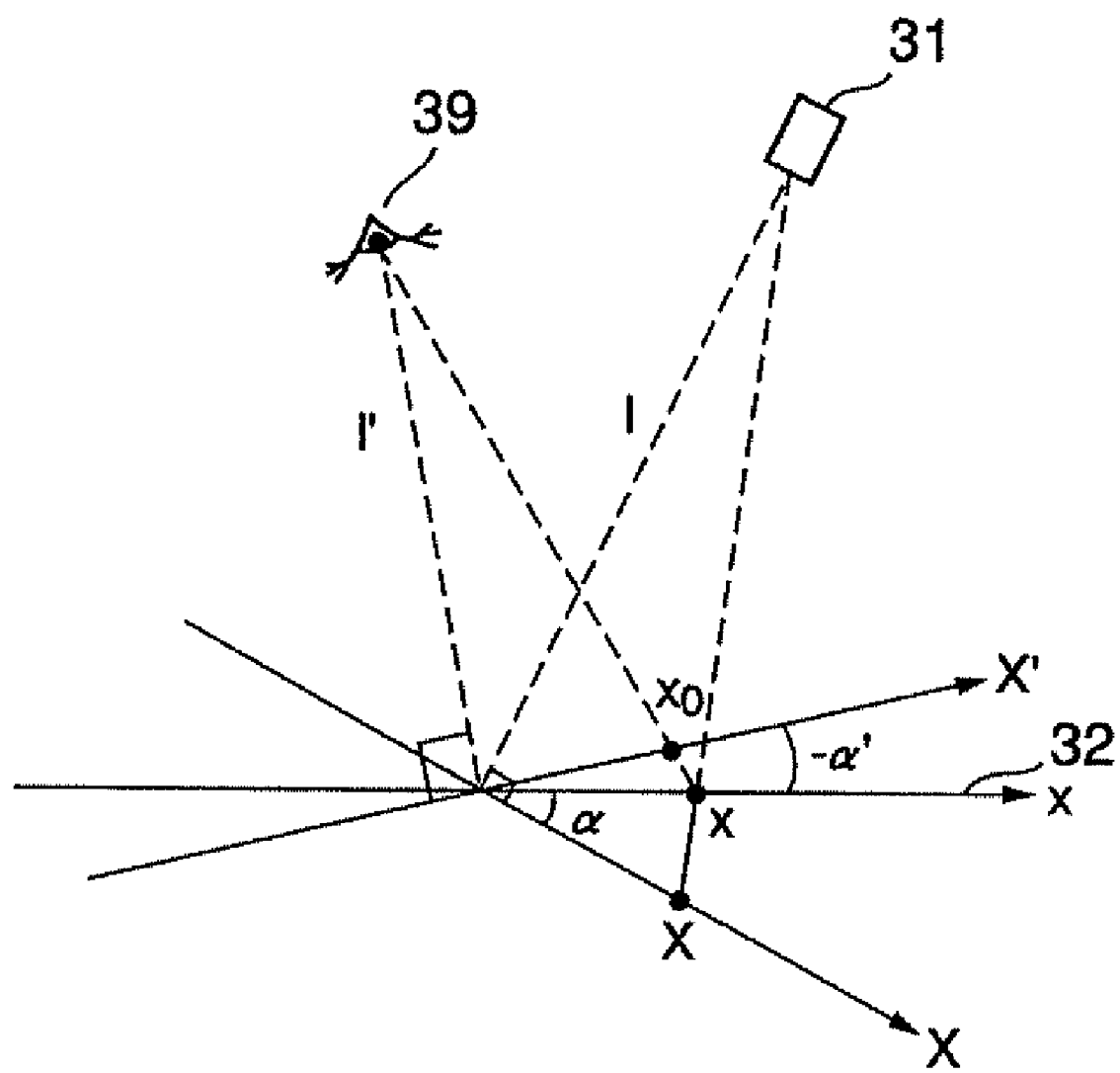
FIG. 26 is a diagram for explaining a positional relationship of the image projection apparatus, the screen and human eyes.

In the following description, it is assumed that the relationship between the image projection apparatus 31 and the screen 32 is described by the parameters α, β, γ and I described above, and that the relationship between the position of the human eye of the viewer watching the screen 32 and the screen 32 is described by the parameters α', β', γ' and I' described above. FIG. 26 is a diagram for explaining the relationship of the image projection apparatus 31, the screen 32 and the position of a human eye 39 in this case.

In FIG. 26, in order to make the image part appear to the viewer as if it is located at a position $X_0$, the image part must be displayed at a position x on the screen 32. In order to project the image part at the position x on the screen 32, the image projection apparatus 31 must project the image part towards the position X. Similarly, in order to make the image part appear to the viewer as if it is located at a position $Y_0$, the image part must be displayed at a position y on the screen 32. In order to project the image part at the position y on the screen 32, the image projection apparatus 31 must project the image part towards the position Y. Accordingly, the following transformation should be made.

$$\begin{pmatrix} X_0 \\ Y_0 \end{pmatrix} \rightarrow \begin{pmatrix} x \\ y \end{pmatrix} \rightarrow \begin{pmatrix} X \\ Y \end{pmatrix}$$

In other words, the formulas (18) through (20) described above should be calculated following the formulas (7A) through (9A). But since the calculations of the formulas (9A) and (18) can be made together, it is consequently necessary to only calculate the formulas (7A) and (8A), the following formulas (9B) and (19A), and the formula (20).

$$\begin{pmatrix} x \\ y \end{pmatrix} = \begin{pmatrix} \cos(\beta' - \beta) & -\sin(\beta' - \beta) \\ \sin(\beta' - \beta) & \cos(\beta' - \beta) \end{pmatrix} \begin{pmatrix} x' \\ y' \end{pmatrix} \quad (9B)$$

$$\begin{pmatrix} X' \\ Y' \end{pmatrix} = \frac{I}{1 - x\sin\alpha} \begin{pmatrix} x\cos\alpha \\ y \end{pmatrix} \quad (19A)$$

In a case where $$\begin{pmatrix} \alpha \\ \beta \\ \gamma \\ 1 \end{pmatrix} \approx \begin{pmatrix} \alpha' \\ \beta' \\ \gamma' \\ 1' \end{pmatrix}$$

the projection angle is approximately the same as the incident angle, and the transformation becomes as follows.

$$\begin{pmatrix} X \\ Y \end{pmatrix} \approx \begin{pmatrix} X_0 \\ Y_0 \end{pmatrix}$$

When the formulas (7A), (8A), (9B), (19A) and (20) are actually calculated under the following condition $$\begin{pmatrix} \alpha \\ \beta \\ \gamma \\ 1 \end{pmatrix} = \begin{pmatrix} \alpha' \\ \beta' \\ \gamma' \\ 1' \end{pmatrix}$$

it may be confirmed that the following formula stands.

$$\begin{pmatrix} X \\ Y \end{pmatrix} = \begin{pmatrix} X_0 \\ Y_0 \end{pmatrix}$$

Therefore, when carrying out the image transformation in the case where the viewer watches the display or screen from the direction that is oblique to the display or screen, in a case where the image to be treated is described by digital image data, the image is represented by a collection of pixels (picture elements), and the image data are formed by pixel data. Hence, the calculation may be made similarly to the case of the image transformation process described above, but in an opposite direction, so as to obtain a weighted average of the pixel values of 4 pixels neighboring the corresponding pixel of the original image.

The formulas described above, which are used for the image transformation process, do not take into consideration the change in brightness. However, it is possible to improve the picture quality by increasing the luminance value of the image part that is displayed at a screen portion further away from the image projection apparatus or, by increasing the luminance value as the tilt from a normal of the incident angle with respect to the screen increases.

This application claims the benefit of a PCT International Application No. PCT/JP02/01314 filed Feb. 15, 2002, the disclosure of which is hereby incorporated by reference.

Further, the present invention is not limited to these embodiments, but various variations and modifications may be made without departing from the scope of the present invention.

What is claimed is:

1. An image transformation apparatus, comprising:
 a coordinate transformation unit configured to make a transformation to transform a projected image that is projected on a screen by an image projection apparatus having an optical axis tilted by an arbitrary angle with respect to the screen, into an image substantially equivalent to an image that is projected on the screen in a state where the optical axis of the image projection apparatus is perpendicular to the screen; and
 a luminance value substituting unit configured to substitute luminance values of coordinates before the transformation as luminance values corresponding to coordinate values after the transformation,
 wherein said coordinate transformation unit comprises:
  a part configured to carry out a $-\gamma$ rotation process to rotate coordinates (X, Y) to coordinates (X', Y') using a formula $$\begin{pmatrix} X' \\ Y' \end{pmatrix} = \begin{pmatrix} \cos(-\gamma) & -\sin(-\gamma) \\ \sin(-\gamma) & \cos(-\gamma) \end{pmatrix} \begin{pmatrix} X \\ Y \end{pmatrix};$$

a part configured to carry out a tilt transformation process to transform the coordinates (X', Y') into coordinates (x', y') using a formula $$\begin{pmatrix} x' \\ y' \end{pmatrix} = \frac{1}{l\cos\alpha + X'\sin\alpha} \begin{pmatrix} X' \\ Y'\cos\alpha \end{pmatrix}; \text{ and}$$

a part configured to carry out a $\beta$ rotation process to rotate the coordinates (x', y') to coordinates (x, y) using a formula $$\begin{pmatrix} x \\ y \end{pmatrix} = \begin{pmatrix} \cos\beta & -\sin\beta \\ \sin\beta & \cos\beta \end{pmatrix} \begin{pmatrix} x' \\ y' \end{pmatrix},$$

where $\alpha$ denotes a tilt angle of the optical axis of the image projection apparatus with respect to an axis perpendicular to the screen, $\beta$ denotes an angle formed by a straight line that is a projection of the optical axis on the screen and a reference axis (x-axis) of the screen, $\gamma$ denotes an angle formed by a tilt direction of the image projection apparatus on the projected image and a reference axis (X-axis) on the projected image, (X, Y) denotes the coordinates on the projected image, and (x, y) denotes the coordinates on the screen,
 wherein the formulas are successively calculated to obtain the coordinates (x, y) before the transformation corresponding to the coordinates (X, Y) of the projected image after the transformation.

2. The image transformation apparatus as claimed in claim 1, wherein said coordinate transformation unit comprises:
 a part configured to carry out the $-\gamma$ rotation process to rotate the coordinates (X, Y) to the coordinates (X', Y') using a formula $$\begin{pmatrix} X' \\ Y' \end{pmatrix} = \begin{pmatrix} \cos(-\gamma) & -\sin(-\gamma) \\ \sin(-\gamma) & \cos(-\gamma) \end{pmatrix} \begin{pmatrix} I - I_0 \\ J_0 - J \end{pmatrix} dp;$$

a part configured to carry out the tilt transformation process to transform the coordinates (X', Y') to the coordinates (x', y') using a formula $$\begin{pmatrix} x' \\ y' \end{pmatrix} = \frac{1}{l\cos\alpha + X'\sin\alpha} \begin{pmatrix} X' \\ Y'\cos\alpha \end{pmatrix};$$

a part configured to carry out the $\beta$ rotation process to rotate the coordinates (x', y') to coordinates (x, y) using a formula $$\begin{pmatrix} x \\ y \end{pmatrix} = \begin{pmatrix} \cos\beta & -\sin\beta \\ \sin\beta & \cos\beta \end{pmatrix} \begin{pmatrix} x' \\ y' \end{pmatrix}; \text{ and}$$

a part configured to carry out an inverse transformation process to inverse-transform the coordinates (x, y) to coordinates (i', j') using a formula $$\begin{pmatrix} i' \\ j' \end{pmatrix} = \begin{pmatrix} i_0 + x/dp \\ j_0 - y/dp \end{pmatrix},$$

where dp denotes a distance between two adjacent pixels on the screen, (I', J') denotes coordinates of pixels on the projected image, (i, j) denotes coordinates of pixels of the projected image after the transformation, and $(I_0, J_0)$ and $(i_0, j_0)$ denote centers of the respective projected images before and after the transformation, wherein the formulas are successively calculated to obtain the coordinates (I', J') before the transformation corresponding to the coordinates (i, j) of the pixels of the projected image after the transformation.

3. The image transformation apparatus as claimed in claim 2, wherein said luminance value substituting unit comprises:
a part configured to obtain i and j from a formula $$\begin{pmatrix} i \\ j \end{pmatrix} = \begin{pmatrix} [i'] \\ [j'] \end{pmatrix},$$

where 4 pixel coordinates actually existing in a neighborhood of the coordinates (i', j') are (i, j), (i+1, j), (i, j+1) and (i+1, j+1), and [ ] denotes a Gauss symbol; and a part configured to obtain a weighted average of pixel values of the neighboring 4 pixels using a formula p(i, j)=(I+J−J'){(1+I−I')P(I, J)+(I'−I)P(I+1, J)}+(J'−J){(1+I−I')P(I, J+1)+(I'−I)P(I+1, J+1)}, where P(i, j) denotes the luminance value of the original image, and p(I, J) denotes the luminance value after the transformation.

* * * * *